United States Patent
Shiota et al.

(10) Patent No.: US 10,411,950 B2
(45) Date of Patent: Sep. 10, 2019

(54) ON-VEHICLE SYSTEM, PROGRAM, AND CONTROLLER

(71) Applicant: Renesas Electronics Corporation, Tokyo (JP)

(72) Inventors: Shigemasa Shiota, Tokyo (JP); Takeshi Sunada, Tokyo (JP); Akihiro Yamate, Tokyo (JP); Daisuke Oshida, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 186 days.

(21) Appl. No.: 15/416,494

(22) Filed: Jan. 26, 2017

(65) Prior Publication Data

US 2017/0244594 A1    Aug. 24, 2017

(30) Foreign Application Priority Data

Feb. 22, 2016  (JP) ................. 2016-030663

(51) Int. Cl.
  *H04L 12/24*  (2006.01)
  *H04W 4/48*  (2018.01)
  (Continued)

(52) U.S. Cl.
  CPC ........ *H04L 41/0668* (2013.01); *G07C 5/0808* (2013.01); *H04L 41/0677* (2013.01);
  (Continued)

(58) Field of Classification Search
  CPC ............. H04L 41/0668; H04L 41/0677; H04L 41/0645; H04L 43/0817; H04L 43/0852; H04L 43/10; H04L 43/16; H04L 63/123; H04L 63/1441; H04L 67/12; H04W 4/48; H04W 12/10; H04W 12/12; H04W 88/16; G07C 5/0808

See application file for complete search history.

(56) References Cited

U.S. PATENT DOCUMENTS 6,463,373 B2   10/2002  Suganuma et al.
9,003,511 B1 *  4/2015  Yang ..................... G06F 21/55
                                                    726/13

(Continued)

FOREIGN PATENT DOCUMENTS

JP    2002-221075 A    8/2002
JP    2008-259124 A   10/2008

*Primary Examiner* — Thomas E Worden
(74) *Attorney, Agent, or Firm* — McDermott Will & Emery LLP

(57) ABSTRACT

In an on-vehicle system, the gateway is duplexed, and a countermeasure table is included. The countermeasure table defines a failure phenomenon occurring in communication, an identification method for identifying a factor on whether the failure phenomenon is caused by a failure of the gateway or caused by a security attack on the gateway, and a corresponding countermeasure method. When it is detected that a failure phenomenon has occurred is communication through the gateway, the on-vehicle system determines a factor of the detected failure phenomenon based on the identification method defined in the countermeasure table, and makes countermeasures in accordance with the corresponding countermeasure method.

19 Claims, 17 Drawing Sheets

(51) Int. Cl.

| | |
|---|---|
| *G07C 5/08* | (2006.01) |
| *H04L 12/26* | (2006.01) |
| *H04L 29/06* | (2006.01) |
| *H04L 29/08* | (2006.01) |
| *H04W 12/10* | (2009.01) |
| *H04W 12/12* | (2009.01) |
| *H04W 88/16* | (2009.01) |

(52) U.S. Cl.
CPC ...... *H04L 43/0817* (2013.01); *H04L 43/0852* (2013.01); *H04L 43/10* (2013.01); *H04L 43/16* (2013.01); *H04L 63/123* (2013.01); *H04L 63/1441* (2013.01); *H04L 67/12* (2013.01); *H04W 4/48* (2018.02); *H04W 12/10* (2013.01); *H04W 12/12* (2013.01); *H04L 41/0645* (2013.01); *H04W 88/16* (2013.01)

(56) References Cited

U.S. PATENT DOCUMENTS

| | | | |
|---|---|---|---|
| 9,578,567 B1* | 2/2017 | Laganier | H04L 41/0668 |
| 9,632,502 B1* | 4/2017 | Levinson | G01S 17/875 |
| 9,769,250 B2* | 9/2017 | Powers | H04L 63/1441 |
| 2013/0031212 A1* | 1/2013 | Enosaki | H04L 12/40 |
| | | | 709/218 |
| 2015/0085645 A1* | 3/2015 | Kim | H04L 45/28 |
| | | | 370/228 |
| 2016/0277436 A1* | 9/2016 | Lim | H04L 63/1441 |
| 2017/0244594 A1* | 8/2017 | Shiota | G07C 5/0808 |

* cited by examiner

FIG. 9

| FAILURE PHENOMENON | IDENTIFICATION METHOD 1 | IDENTIFICATION METHOD 2 | IDENTIFICATION METHOD 3 (SELF-DIAGNOSIS RESULT AT GATEWAY) | COUNTERMEASURE METHOD |
|---|---|---|---|---|
| PACKET 1 RECEPTION COMPLETION NOTIFICATION NOT RETURNED | AFTER RETRANSMISSION OF PACKET 1, PACKET 1 RECEPTION NOTIFICATION RETURNED | NUMBER OF ERRORS Nerror≤N1max | NO PROBLEM | Nerror = Nerror+1; |
| | | | FAILURE | PACKET TRANSMISSION THROUGH GATEWAY 2 |
| | | | SECURITY ATTACK | DISCONNECTION OF NET COUPLING OF GATEWAY 1, DISCONNECTION INSTRUCTION, PACKET TRANSMISSION THROUGH GATEWAY 2 |
| | | NUMBER OF ERRORS Nerror>N1max | NO PROBLEM | PACKET TRANSMISSION THROUGH GATEWAY 2 |
| | | | FAILURE | PACKET TRANSMISSION THROUGH GATEWAY 2 |
| | | | SECURITY ATTACK | DISCONNECTION OF NET COUPLING OF GATEWAY 1, DISCONNECTION INSTRUCTION, PACKET TRANSMISSION THROUGH GATEWAY 2 |
| | AFTER RETRANSMISSION OF PACKET 1, PACKET 1 RECEPTION COMPLETION NOTIFICATION NOT RETURNED | | | PACKET TRANSMISSION THROUGH GATEWAY 2 |
| PACKET 1 LARGE DELAY IN RECEPTION OF RECEPTION COMPLETION NOTIFICATION | DELAY TIME Tdelay≤Tmax | NUMBER OF DELAYS Ndelay≤N2max | | Ndelay = Ndelay+1; |
| | | NUMBER OF DELAYS Ndelay>N2max | | PACKET TRANSMISSION THROUGH GATEWAY 2 |
| | DELAY TIME Tdelay>Tmax | | | PACKET TRANSMISSION THROUGH GATEWAY 2 |

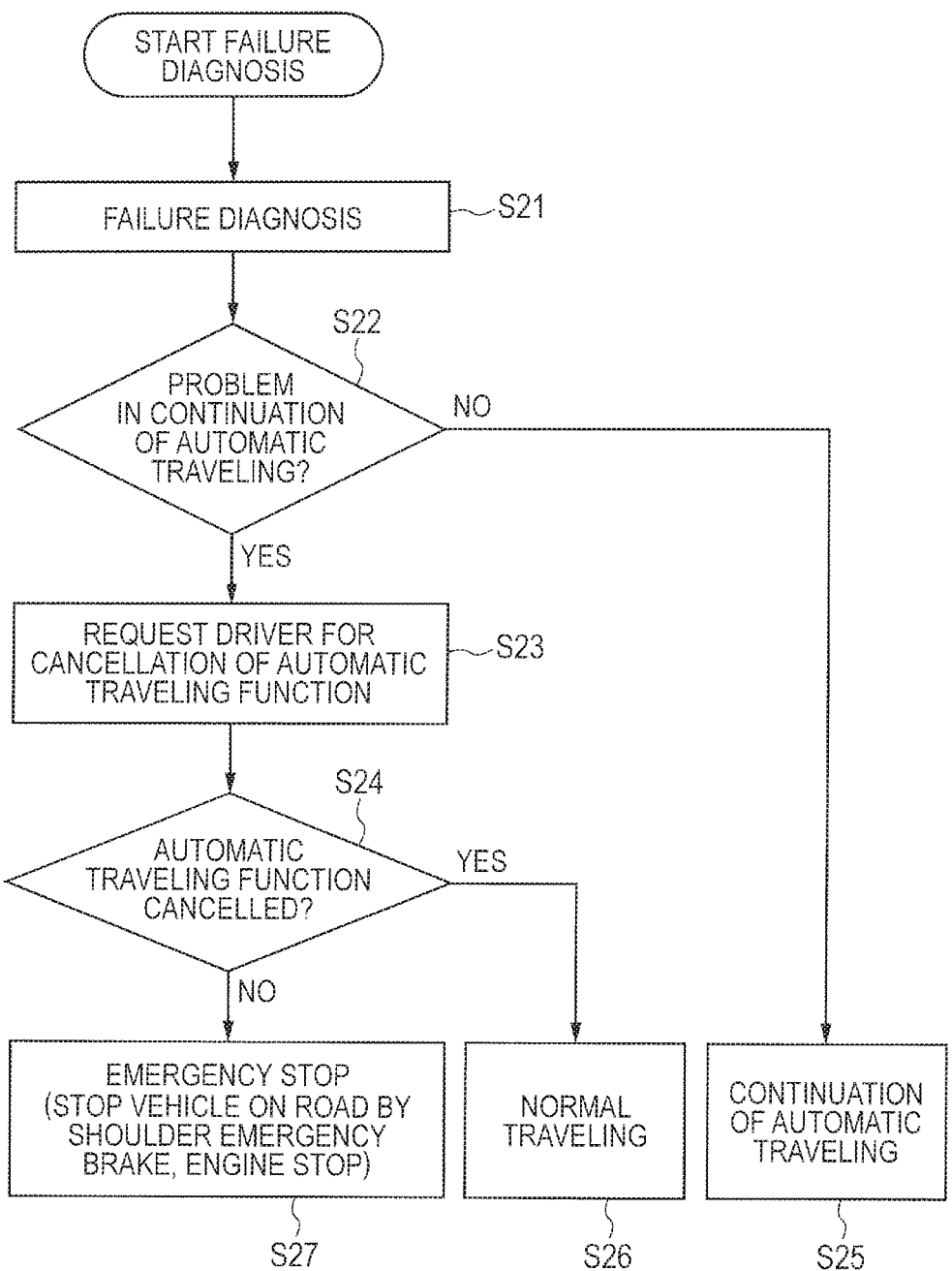

ON-VEHICLE SYSTEM, PROGRAM, AND CONTROLLER

CROSS-REFERENCE TO RELATED APPLICATIONS

The disclosure of Japanese Patent Application No. 2016-030663 filed on Feb. 22, 2016 including the specification, drawings and abstract is incorporated herein by reference in its entirety.

The present invention relates to an on-vehicle system, a program, and a controller, and more particularly to a technique suitably used for a vehicle on which an automatic traveling control function is mounted.

BACKGROUND

In vehicles, a network is configured with, an ECU (Electronic Control Unit), as a component, of a control system for controlling the engine, the motor, the brake, and the handle. The network configuration is made for not only the navigation system, but also for the information system, unit (such as a communication apparatus for a server outside the vehicle performing inter-vehicle/road-vehicle communication), with a communication path, such as a CAN (Controller Area Network) or Ethernet (registered trademark, the same shall apply hereinafter) Further, to realize the automatic traveling of the vehicles, the control system network and the information system, network are logically integrated in a single network. To protect these networks from a malicious security attacker, a security function is necessarily formed mainly using an encryption technique. On the other hand, the vehicles need to satisfy some requirement based on the functional safety as a keyword.

Japanese Unexamined Patent Application Publication No. 2002-221075 discloses a fail-safe system in integrated control of vehicles. In the vehicle integrated system which is vehicle-integrally controlled, the navigation ECU, a plurality of information system ECUs (such as the air-conditioner ECU), the engine ECU, the transmission ECU, and the control system ECU (such as the traveling control ECU) are coupled to a single communication line. Upon detection of a failure in any of the ECUs included in the system, the one having predetermined performance is selected from the rest of ECUs without failure, in accordance with preset priorities. A basic program for the failed ECU s downloaded and operated on the selected ECU, thereby taking over the failed ECU. As a result, at least the vehicle can travel, even when any of the ECUs fails.

Japanese Unexamined Patent Application Publication No. 2008-259124 discloses an on-vehicle communication system which is configured with two communication buses coupled to the ECUs, a gateway for coupling the two communication buses, and a third ECU. Upon detection of a malfunction in the gateway, the above-described third ECU takes over it. The third ECU includes means for detecting the malfunction of the gateway, means for replacing the function of the gateway, and process restriction means for stopping or restricting the process for communication data. Upon detection of occurrence of the malfunction in the gateway, the function of the gateway is replaced, after the process restriction means stops or restricts a process with a low priority.

SUMMARY

As a result of inventors' examination on Japanese Unexamined Patent Application Publications No. 2002-221075 and No. 2008-259124, the following new problem has been found. That is, in any of the prior art documents, it is simply assumed that the failure or malfunction of the units has been detected. In addition, it is not possible to sufficiently handle the security in the vehicles, for example, at the occurrence of a security attack during the automatic traveling.

For the security of vehicles, an examination is provided in an EVITA (E-Safety Vehicle instruction Protected Application) project in which Japanese corporations also have participated, in Europe. The present inventors have examined the problem, which occurs at the time of realizing automatic traveling in an on-vehicle network, assumed in the EVITA project.

FIG. 1 is an explanatory diagram schematically illustrating a configuration example of an on-vehicle system for realizing the automatic traveling. The on-vehicle system for realizing the automatic traveling is configured in a manner that an automatic traveling controller 1 can communicate with not only various controllers inside the vehicle, but also the equipment and device outside the vehicle, through a gateway 2. In the vehicle, it is configured that mutual communication can be made among, including an automatic traveling controller 1, a sensor system controller 4 (coupled to sensors, such as a camera 11, a peripheral object sensor 12, and a speed sensor 13), a brake/handle system controller 5, an engine/motor system controller 6, a MODEM 7, a GPS 8, and a maintenance connector 3, through the gateway 2.

The peripheral object sensor 12 is a sensor sensing a peripheral object including the front side of the vehicle, for example, an obstacle, a pedestrian, a white line showing the lane or the medial strip, or the sign or traffic light, together with the camera 11. It includes not only optical sensing using the camera 11, but also sensing using radar. The sensor system controller 4 collects information from these sensors, and transmits it to the automatic traveling controller 1. The controller 5 is a controller controlling the brake or the handle, while the controller 6 is a controller controlling the engine or the motor. The maintenance connector 3 is a connector for coupling to a maintenance terminal 10, conforming to, for example, ODB2 (On-Board Diagnostic System 2). The GPS 8 is a communication unit for getting to know a person's own position using a GPS (Global Positioning System). A MODEM (Modulation DEModulation unit) 9 is a communication unit for coupling to a WAN (Wide Area Network) outside the vehicle, wirelessly communicates with, for example, a base station 22, and functions as an interface for coupling to an external information server 20 through a network, such as the Internet 21. The above various units inside the vehicle are coupled in fact separately to a plurality of on-vehicle networks, while a relay unit, representatively the gateway 2, relays communication with the units therebetween.

The automatic traveling controller 1 acquires positional information of the own vehicle from, the GPS 8, and totally analyzes map information supplied from the information server 20 outside the vehicle through the MODEM 9, traffic information (traffic jam or rules), and information of the own vehicle and peripheral object which is acquired from the sensor system controller 4, and adequately controls the controllers 5 and 6. By so doing, it adjusts the speed, and instructs the travel direction of the vehicle.

FIG. 2 is a flowchart illustrating a configuration example of a control flow for realizing the automatic traveling in the on-vehicle system of FIG. 1. When the driver selects an automatic traveling function, the camera/peripheral object sensor/GPS function is activated, and establishes coupling to the external information server 20 (S1). It detects the position, the speed, and the peripheral object of the own vehicle, based on data collected from the camera 11, the peripheral sensor 12, and the speed sensor 13 and information supplied from the external information server 20 (S2). The automatic traveling controller 1 executes the following controlling based on the information items, thereby realizing the automatic traveling. It determines whether there is an obstacle (S3). When it is determined that there is an obstacle, it executes collision avoidance control for avoiding the obstacle, by slowing down the vehicle and the handle operation (S4). It calculates the distance to the preceding vehicle, and determines whether the distance between the vehicles is sufficiently secured (S5). When the distance is not sufficiently secured, it executes an inter-vehicle distance securing control for slowing down the vehicle (S6). It obtains the speed of the own vehicle, and determines whether the speed is within a set speed range (S7). When it determines that the speed is outside the set speed range, it executes speed control for slowing down or accelerating the vehicle (S8). It determines whether the own vehicle is adequately traveling in the lane, based on the peripheral images of the own vehicle which are obtained by the camera 11 (S9). When it determines that the own vehicle is outside the lane or may possibly be outside the lane, it executes lane returning control by handle operation (S1).

FIG. 3 is a flow diagram 1 illustrating an example of a communication flow for realizing the automatic traveling in the on-vehicle system of FIG. 1. To execute the above control flow for realizing the automatic traveling, the automatic traveling controller 1 performs communication with various units. The automatic traveling controller 1 transmits a coupling request to the camera/sensor/GPS and the external server, through the gateway 2. In this case, the camera/sensor/GPS and the external server represent directly the sensor system controller 4, the GPS 8, and the MODEM 7, illustrated in FIG. 1. Upon completion of requested coupling, the camera/sensor/GPS and the external server returns coupling completion notification to the automatic traveling controller 1 through the gateway 2. The automatic traveling controller 1 transmits automatic traveling preparation requests 1 and 2 to the brake/handle system controller 5, the engine/motor system controller 6, through the gateway 2. After the preparation is completed, it receives preparation completion notification from the controllers 5 and 6 through the gateway 2. Preparation for the automat traveling is completely made at this stage. The automatic traveling controller 1 transmits an information transmission request to the camera/sensor/GPS and the external server through the gateway 2. Then, the camera/sensor/GPS and the external server transmit the requested information through the gateway 2. The automatic traveling controller 1 totally analyzes the received information, and transmits a control request 1 and/or a control request 2 to all or one of the brake/handle system controller 5 and the engine/motor system controller 6, thereby automatically controlling the traveling of the vehicle.

FIG. 4 is an explanatory diagram illustrating an example in which an unauthorized controller 9 is coupled to the on-vehicle system of FIG. 1. Though it has the same configuration as that of FIG. 1, the unauthorized controller 9 is coupled thereto. In FIG. 4, it is coupled directly to the gateway 2. However, in fact, it is coupled to an on-vehicle network for coupling, for example, the sensor system controller 4 and the gateway 2.

Alternatively, a considered attack may be a case in which unauthorized software is sent from the maintenance connector 3 to the already-coupled ECU. In this example, it is assumed that the case attack would be made by impersonation.

FIG. 5 is an explanatory diagram illustrating an application example for an on-vehicle system with a countermeasure against impersonation by CMAC. The CMAC (Cipher-based Message Authentication Code) is a message authentication code based on encryption. Generally, a secure MAC algorithm (such as CMAC) is applied for the security attack assumed to be made by impersonation, thereby making the countermeasure for that. FIG. 5 illustrates an example of operations in a case where the countermeasure against impersonation by CMAC is applied to the on-vehicle system. The same secret key 1 is shared by the automatic traveling controller 1 as the transmission side and, for example, the traveling control system controller 5 or 6 as the receiver side. Note that the automatic traveling controller 1 and the traveling control system controller are coupled to each other through a communication path such as a CAN (Controller Area Network).

The automatic traveling controller 1 as the transmission side generates a message authentication code CMAC-1 by a CMAC generation function from Data-1 including information to be transmitted and the Secret Key 1, and transmits the Data-1 with the CMAC-1 to the traveling control system controller as the receiver side through the communication path such as the CAN. Upon reception of this, the traveling control system controller generates a message authentication code CMAC-2 using the CMAC generation function from the received Data-1 and the Secret Key 1 of its own. It compares the generated CMAC-2 and the received CMAC-1. When there is coincidence therebetween, it uses the Data-1 as authorized data (for example, uses it as data for controlling the handle). When there is no coincidence therebetween, it discards the received packet. Let it be assumed that the unauthorized controller 9 transmits unauthorized control information while impersonating the automatic traveling controller 1. In this case, because the unauthorized controller 9 does not have the authorized secret key 1, the CMAC-2 generated by the traveling control system controller does not coincide with the received CMAC-1, and the packet transmitted by the unauthorized controller 9 is discarded. As a result, it enables to prevent the impersonation.

FIG. 6 is a flow diagram illustrating an example of a communication flow of a case where no countermeasure is taken for the impersonation in the on-vehicle system. FIG. 7 is a flow diagram illustrating an example of a communication flow of a case where a countermeasure is taken for the impersonation using the CMAC. In both cases, like the case illustrated in FIG. 3, the automatic traveling controller 1 transmits a coupling request to the camera/sensor/GPS and the external server through the gateway 2, to sufficiently prepare for the automatic traveling. After this, the automatic traveling controller 1 transmits an information transmission request 1 to the camera/sensor/GPS and the external server through the gateway 2, receives transmitted information 1, transmits control requests 1-1 and 2-1 to the controllers 5 and 6 based on the received information, and transmits next control requests 2-1 and 2-2 based on transmitted information 2 received in response to transmission of an information transmission request 2. In this manner, the automatic traveling control is performed by collecting information from the camera/sensor/GPS and the external server and controlling the controllers 5 and 6. Let it be assumed that the unauthorized controller 9 transmits unauthorized information to the automatic traveling controller 1 through the gateway 2. This case is an example in which the unauthorized controller 9 impersonates the camera/sensor/GPS and the external server.

When no countermeasure is taken for the impersonation in the on-vehicle system, as illustrated in FIG. 6, unauthorized control requests 1 and 2 are undesirably transmitted respectively to the controllers 5 and 6, based on the unauthorized information received by the automatic traveling controller 1. On the other hand, when the countermeasure for the impersonation is taken using the CMAC, as illustrated in FIG. 7, the automatic traveling controller 1 performs an authentication process for the received unauthorized information using the CMAC. Thus, it is possible to discard the received unauthorized packet, thereby not allowing unauthorized control for the controllers 5 and 6. Note that it may be configured to perform the authentication using the CMAC by the gateway 2, instead of the automatic traveling controller 1.

In this manner, when the security function using the encryption function is applied as is to the on-vehicle system, the unauthorized data can be distinguished and discarded. However, when the data directly relates to traveling control of the vehicle, for example, control information regarding the brake, the accelerator, or the handle, the discarding of the data may fearfully cause a trouble in the traveling control. For example, in the circumstance where the inter-vehicle distance cannot sufficiently be secured, the inter-vehicle distance is not adequately secured. This may cause a car accident. Accordingly, in the on-vehicle system, when particularly the automatic traveling control is performed, there is found a problem that the functional safety cannot sufficiently be secured by simply embedding the security function.

Descriptions will now be made to means for solving the above problems, and any other objects and new features will be apparent from the descriptions of the present specification and the accompanying drawings.

According to an embodiment, the following is provided.

That is, an on-vehicle system includes an electronic device, a gateway, and a controller enabling communication with the electronic device through the gateway. In this system, the gateway is duplexed, and the on-vehicle system has a countermeasure table.

The countermeasure table defines a failure phenomenon, an identification method, and a corresponding countermeasure method. The phenomenon occurs in communication between the controller and the electronic device through the gateway. The identification method is for identifying a factor on whether the failure phenomenon is caused by a failure of the gateway or by a security attack on the gateway. When it is detected that the failure phenomenon has occurred in the communication through the gateway, the on-vehicle system determines the factor of the detected failure phenomenon based on the identification method defined in the countermeasure table, and makes countermeasures in accordance with the corresponding countermeasure method.

When it is determined that the factor of the failure phenomenon is caused by the failure of the gateway, the gateway is replaced by another gateway. When determined that the factor of the failure phenomenon is caused by a security attack on the gateway, the gateway is replaced by another gateway, and the gateway is disconnected from a communication path between the controller and the electronic device.

The effect attained by the one embodiment is briefly as follows.

That is, the failure of the gateway and the security attack are distinguished. It is possible to adopt adequate countermeasure policies for both cases, thereby suitably securing the functional safety.

BRIEF DESCRIPTION OF THE DRAWINGS

FIG. 9 is an explanatory diagram schematically illustrating an example of a countermeasure table mounted on the on-vehicle system of the embodiment 1.

FIG. 18 is a flowchart illustrating a configuration example of failure diagnosis in the flow of FIG. 17.

DETAILED DESCRIPTION

Figure 1:
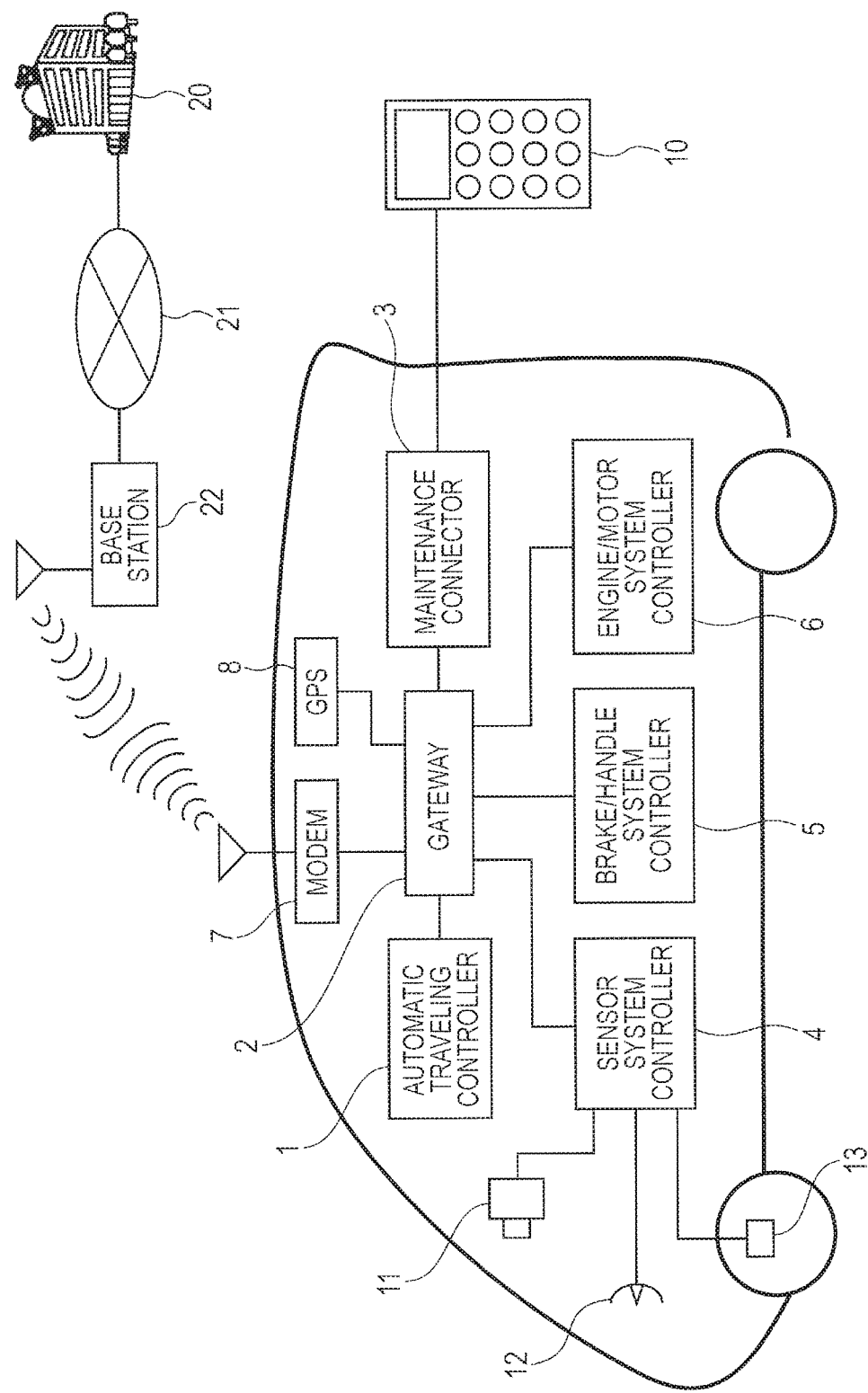
FIG. 1 is an explanatory diagram schematically illustrating a configuration example of an on-vehicle system for realizing automatic traveling.

Preferred embodiments will now be described. The same constituent elements are identified by the same reference numerals, and will not be described over and over.

Embodiment 1

Figure 8:
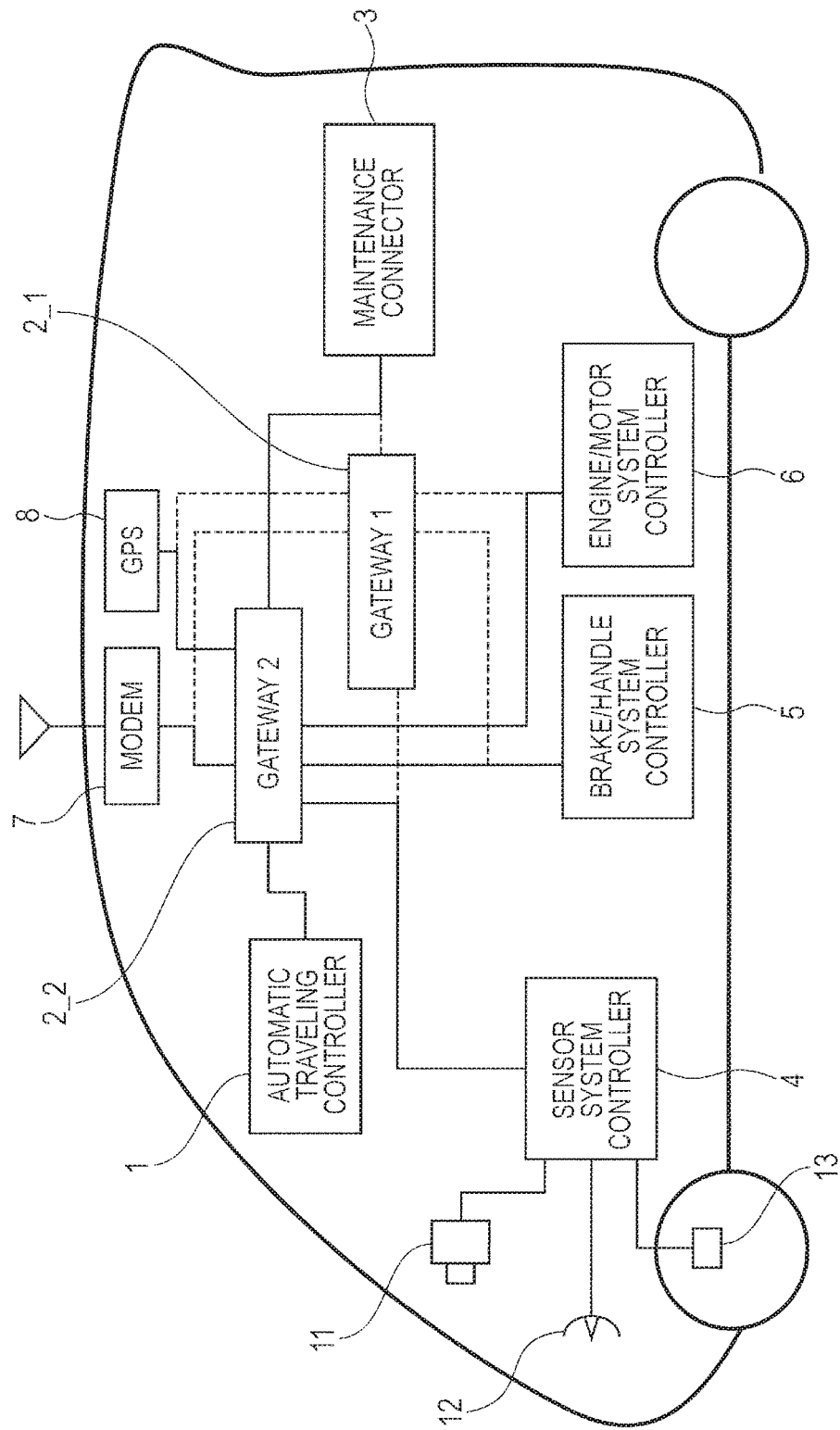
FIG. 8 is an explanatory diagram schematically illustrating a configuration example of an on-vehicle system, according to an embodiment 1.

FIG. 8 is an explanatory diagram schematically illustrating a configuration example of an on-vehicle system according to an embodiment 1. Though this system is the same as the on-vehicle system illustrated in FIG. 1, the only difference is that a gateway 2 is duplexed. In place of the gateway 2 of the on-vehicle system illustrated in FIG. 1, a first gateway 2_1 (gateway 1 in the illustration) and a second gateway 2_2 (gateway 2 in the illustration) are included. In addition, it configured that an automatic traveling controller 1 can communicate with not only various controllers inside the vehicle, but also the equipment and device outside the vehicle, through either of the first gateway and the second gateway 2_2. Other configurations are the same as those illustrated in FIG. 1, and thus will not specifically be described now. Because the gateway is duplexed, it is possible to keep a traveling operation in safety for a certain period, even when a failure has occurred in the gateway, or when the gateway cannot appropriately operate due to a security attack, such as DOS (Denial of Service).

FIG. 9 is an explanatory diagram schematically illustrating an example of a countermeasure table mounted on the on-vehicle system of the embodiment 1. The countermeasure table indicates policies that are referred by programs executed by a device in the on-vehicle system, though not particularly limited, for example, to a computer installed in the automatic traveling controller 1.

The countermeasure table defines a failure phenomenon occurring in communication between the automatic traveling controller 1 and an electronic device (for example, a sensor system controller 4) in the on-vehicle system through the first gateway 2 (the gateway 1 in the illustration), an identification method for identifying a factor on whether the failure phenomenon is caused by a failure of the first gateway 2_1 or by a security attack, and a corresponding countermeasure method.

When it is detected that a failure phenomenon has occurred in communication between the automatic traveling controller 1 and the electronic device (for example, the sensor system controller 4) through the first gateway 21, the on-vehicle system determines a factor of the detected failure phenomenon, and carries out a countermeasure for the determined factor in accordance with a corresponding countermeasure method, based on the identification method defined in the countermeasure table. When it is determined that the factor of the failure phenomenon is a failure of the first gateway 2_1, the first gateway 2_1 is replaced by the second gateway 2_2 (the gateway 2 in the illustration). When it is determined that the factor of the failure phenomenon is a security attack on the first gateway 2_1, the first gateway 2_1 is replaced by the second gateway 2_2, and also the first gateway 2_1 is disconnected from a communication path between the automatic traveling controller 1 and the electronic device. In this case, the communication path is an on-vehicle network, for example, a CAN, the Ethernet, or FlexPay (registered trademark).

In this manner, the failure of the gateway and the security attack are distinguished, and suitable countermeasure methods are adopted respectively for the cases, thereby adequately securing the functional safety. When it is determined that the factor of the failure phenomenon is the security attack, the gateway doubted as infected with the virus by the security attack is disconnected from the on-vehicle system, thereby enabling to prevent the attack entirely on the on-vehicle system from this gateway.

FIG. 9 illustrates a specific example.

The countermeasure table includes three stages of identification methods. The third identification method is self-diagnosis by the first gateway 2_1. The on-vehicle system controls the first gateway 2_1 to carry out the self-diagnosis in accordance with the occurred failure phenomenon, determines whether the factor of the failure phenomenon is the failure of the gateway 2_1 itself or the security attack thereon or whether there is no problem thereon, based on the result of the self-diagnosis, and adopts a corresponding method based on the diagnostic result.

As a result, the factor of the failure phenomenon can accurately be determined, and the countermeasure method can adequately be determined, thereby adequately securing the functional safety.

The countermeasure table of FIG. 9 exemplarily shows a failure phenomenon that reception completion notification returned from the electronic device cannot be received by the automatic traveling controller 1 and a failure phenomenon of large delay in the reception. This notification represents that a packet(s) transmitted from the electronic device (for example, the sensor system controller 4) from the automatic traveling controller 1 through the first gateway 2_1 is completely received.

In the case of the failure phenomenon that the reception completion notification cannot be received, the automatic traveling controller 1 retransmits the packet. Upon reception of reception completion notification in response to the retransmission, the first gateway 2_1 carries out self-diagnosis. Even when reception completion notification cannot be received in response to the retransmission, it is determined that there is a failure in the first gateway 2_1 (identification method 1).

As a result of this, the failure and the security attack can be distinguished by the self-diagnosis of the gateway, without carrying out the countermeasure immediately for the failure, even without reception of the reception completion notification. This enables to adequately secure the functional safety.

Further in the above example, when reception completion notification for the first packet cannot be received, and when the reception completion notification for the retransmission packet is successfully received, the number of errors (Nerror) is counted as the error, and the countermeasure policy is changed in accordance with the number of errors.

When the number of errors (N1max) does not exceed (Nerror≤1max) a predetermined number (N1max), if it is diagnosed that there is no problem in the first gateway 2_1 as a result of the self-diagnosis, the number of errors (Nerror) is counted up, and the first gateway 2_1 is continuously used. As a result of the self-diagnosis, when it is diagnosed that there is a failure in the first gateway 2_1, the first gateway 2_1 is replaced by the second gateway 2_2 (the gateway 2 in the illustration), and a packet is transmitted through the second gateway 2_2. As a result of the self-diagnosis, when diagnosed that there is a security attack, the first gateway 2_1 is replaced by the second gateway 2_2, and further the first gateway 2_1 is disconnected from the communication path between the automatic traveling controller 1 and the above-described electronic device.

On the other hand, when the number of errors exceeds (Nerror>N1max) the predetermined number (N1max), even if it is diagnosed that there is no problem in the first gateway 2_1 as a result of the self-diagnosis, it is determined that there is a failure in the first gateway 2_1, and the first gateway 2_1 is replaced by the second gateway 2_2. In the case of a failure in the first gateway 2_1 and a security attack as a result of the self-diagnosis, the countermeasure method is the same as that applied for the case where the above-described number of errors does not exceed the predetermined number (N1max) (Nerror≤N1max).

As a result, until the number of (times of) errors that the reception completion notification cannot be received reaches a predetermined number, it is possible to continue the use of the gateway, as long as there is not found any problem in the gateway as a result of the self-diagnosis.

The countermeasure table of FIG. 9 exemplifies a failure phenomenon of a large delay in reception of the reception completion notification returned from the electronic device, in addition to the failure phenomenon that the notification cannot be received by the automatic traveling controller 1. More specifically, it defines a failure phenomenon that the reception completion notification returned from the electronic device through the first gateway 2_1 is delayed than a first predetermined time (non-illustrated T0max) and received by the automatic traveling controller 1. In this case, this notification is returned from the electronic device (for example, the sensor system controller 4) through the first gateway 2_1, for a packet transmitted from the automatic traveling controller 1. That is, when the delay time (Tdelay) is greater than the first predetermined time (T0max) and lower than a second predetermined time (Tmax) (T0max<Tdelay≤Tmax), the number of (times of) delays (Ndelay) is counted. When the number of delays (Ndelay) does not exceed a predetermined number of times (N2max) (Ndelay≤N2max), it is determined that there is no failure, the number of delays (Ndelay) is counted up (Ndelay=Ndelay+1), and the first gateway is continuously used. On the contrary, when the number of delays (Ndelay) exceeds the predetermined number of times (N2max) (Ndelay>N2max), or when the delay time (Tdelay) is greater than the second predetermined time (Tmax) (Tdelay>Tmax), it is determined that there is a failure in the first gateway 2_1, and the first gateway 2_1 is replaced by the second gateway 2_2.

As a result, even when the reception completion notification for the transmitted packet is largely delayed and received, the countermeasure is not performed immediately for a failure, and the failure of the gateway and the communication error are distinguished, thereby enabling to adequately secure the functional safety.

The countermeasure table of FIG. 9 exemplifies a case that the self-diagnosis of the first gateway 2_1 is not carried out, when the corresponding reception completion notification is not returned after the retransmission of the packet retransmission, and when it is largely delayed. Even in the cases, it is possible to make a change in that the self-diagnosis of the gateway 2_1 is carried out.

Figure 10:
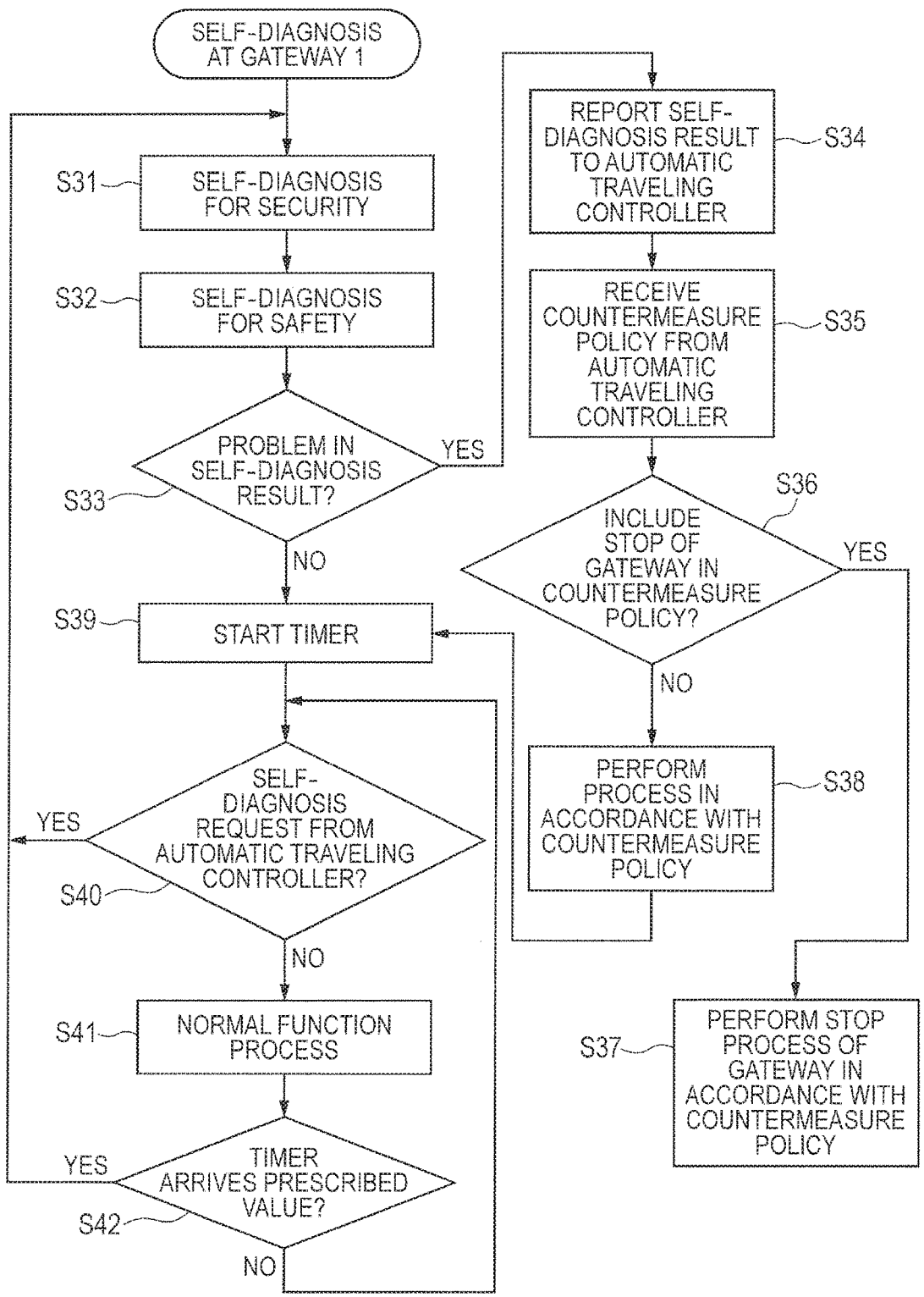
FIG. 10 is a flowchart illustrating a self-diagnostic flow of a first gateway 21.

FIG. 10 is a flowchart illustrating a self-diagnostic flow in the first gateway 2_1 (gateway 1). The first gateway 2_1 carries out security self-diagnosis (S31) and safety self-diagnosis (S32) at the activation of the device. It determines (S33) whether there is a problem in the result of the self-diagnosis. When there is no problem, the timer starts (S39), and it waits for a self-diagnosis request from the automatic traveling controller 1 (S40 to S42).

On the contrary, when there is a problem in the result of the self-diagnosis, it informs the automatic traveling controller 1 of the result of the self-diagnosis (S34), and receives a countermeasure policy from the automatic traveling controller 1 (S35). A determination is made as to whether the received countermeasure policy includes the stop of the first gateway 2_1 (S36). If the stop is included, a stop process of the first gateway 2_1 is executed in accordance with the countermeasure policy (S37). If the received countermeasure policy does not include the stop of the first gateway 2_1, the timer starts (S39) after the process is executed in accordance with the countermeasure policy, and at waits for a self-diagnosis request from the automatic traveling controller 1 (S40 to S42).

In this case, the timer is a timer which measures the elapsed time since the self-diagnosis is executed last. In the self-diagnostic flow, a normal function process (S41) is continued, until the timer reaches a prescribed value (S42), or until a self-diagnosis request is sent from the automatic traveling controller 1 (S40). That is, when the timer reaches a prescribed value (S42), or if a self-diagnosis request is sent from the automatic traveling controller 1 (S40), the security self-diagnosis (S31) and the functional safety self-diagnosis (S32) are executed. As a result, normally, the self-diagnosis is executed at a constant period managed by the timer based on the prescribed value. If the self-diagnosis request is sent from the automatic traveling controller 1, the self-diagnosis is immediately executed even if before reaching the period.

The flow of FIG. 10 is configured with a determination (S40) as to whether the self-diagnosis request is sent from the automatic traveling controller 1, in the loop of S40 to S42. However, it may be configured with execution of the self-diagnosis in response to an interruption request from the automatic traveling controller 1.

Figure 11:
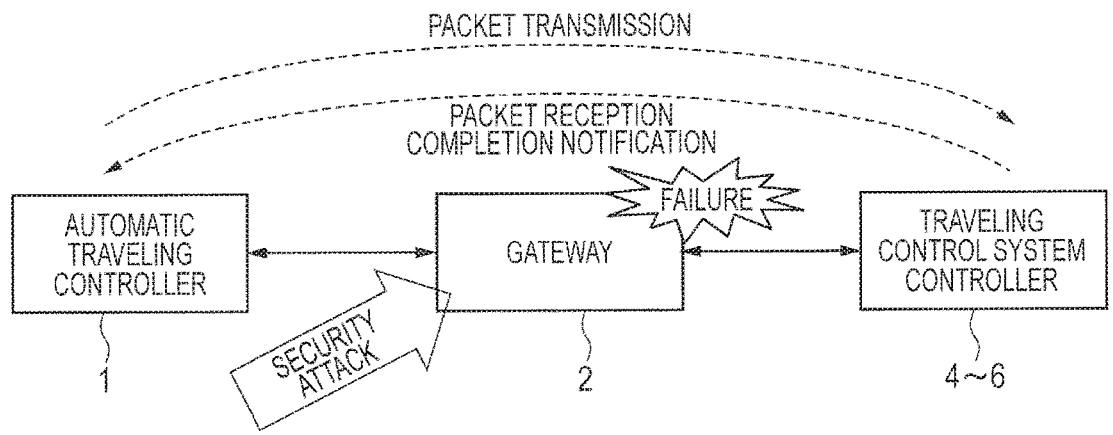
FIG. 11 is an explanatory diagram for explaining a problem in the on-vehicle system in which a non-duplexed gateway is mounted.
Figure 12:
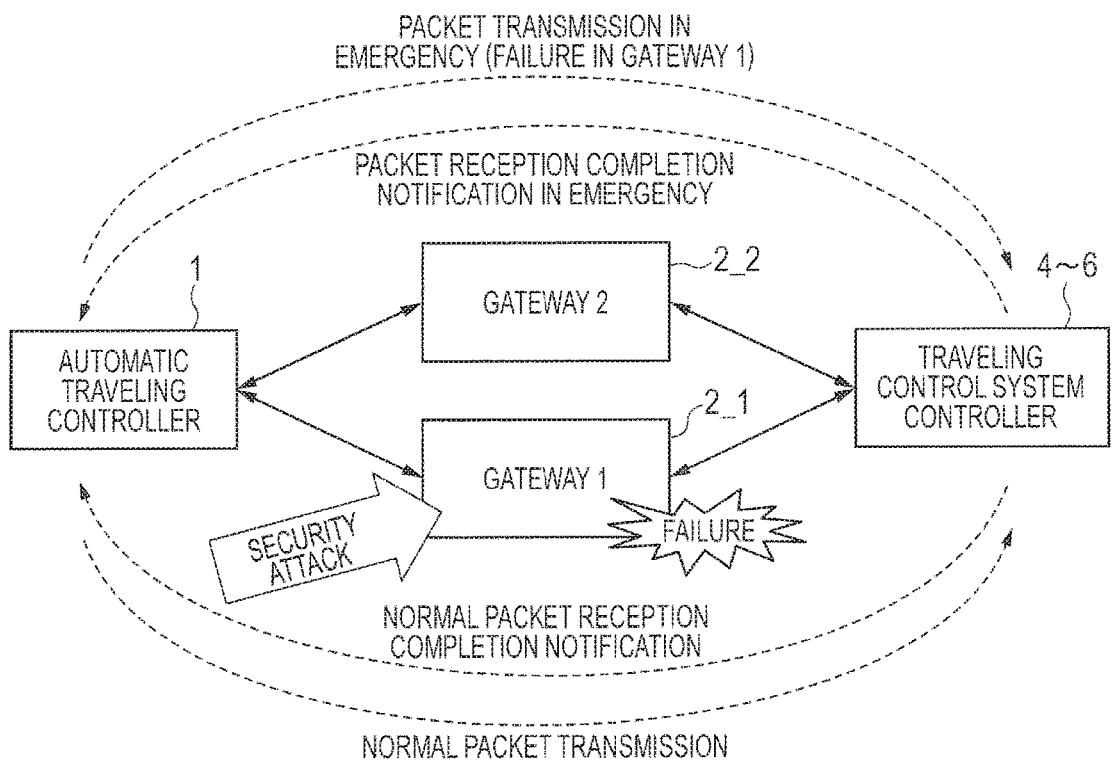
FIG. 12 is an explanatory diagram for explaining an effect that the gateway mounted on the on-vehicle system is duplexed.

FIG. 11 and FIG. 12 are explanatory diagrams for explaining an effect that the gateway mounted on the on-vehicle system is duplexed. FIG. 11 illustrates an on-vehicle system on which a non-duplexed gateway is mounted, while FIG. 12 illustrates an example in which the gateway is duplexed.

The automatic traveling controller 1 transmits a normal packet with an added CMAC or a dummy packet for inspection to traveling control system controllers 4 to 6 through the gateway 2, to identify that the gateway 2 and the traveling control system controllers 4 to 6 appropriately operate for reception. The traveling control system controllers 4 to 6 exemplarily represent controllers for performing some kind of communication with the automatic traveling controller 1. The controllers 4 to 6 include, for example, the sensor system controller 4, the brake/handle system controller 5, and the engine/motor system, controller 6, illustrated in FIG. 1. When the traveling control system controllers 4 to 6 are appropriately receiving the normal packet with the added CMAC or the dummy packet for inspection, another packet with an added CMAC, as packet reception completion notification, is returned to the automatic traveling controller 1, thereby identifying the reception completion. When this packet reception completion notification is not returned or is delayed, the automatic traveling controller 1 can identify that there is some kind of problem in the communication path or in the traveling control system controllers 4 to 6 of a communication partner.

As illustrated in FIG. 11, when the gateway 2 is a single system (not duplexed), it is possible only to detect the security attack or failure. However, the traveling operation cannot be maintained, because communication with the traveling control system controllers 4 to 6 stops. As illustrated in FIG. 12, even when the gateway is duplexed, if a failure has occurred in the first gateway 2_1, or if there is a security attack thereon, the communication path is switched to the second gateway 2_2. This enables to continue the communication with the traveling control system controllers 4 to 6. Thus, the traveling operation can continue at least for a certain period of time.

FIG. 8 and FIG. 12 illustrate examples of the duplexed gateway. However, the gateway may further be multiplexed. When the first gateway is a regular system, while the second gateway is a standby system, the standby system gateway may be replaced by a replacement relay device (for example, a simple hub) having the minimum required data relay function. Even when the relay function of the replacement, relay device is inferior to the regular system, and when it has poor performance to realize the automatic traveling, it is possible to suppress the minimum required vehicle traveling control to a possible extent. By the configuration with replacement by the replacement relay device with poor performance, it is possible to suppress an increase in the cost due to the duplication. Even when the replacement is made, the minimum required vehicle traveling function is included, thereby securing the functional safety.

Descriptions will now further specifically be made to an operation of the on-vehicle system in which the gateway is duplexed, in the embodiment 1.

Figure 4:
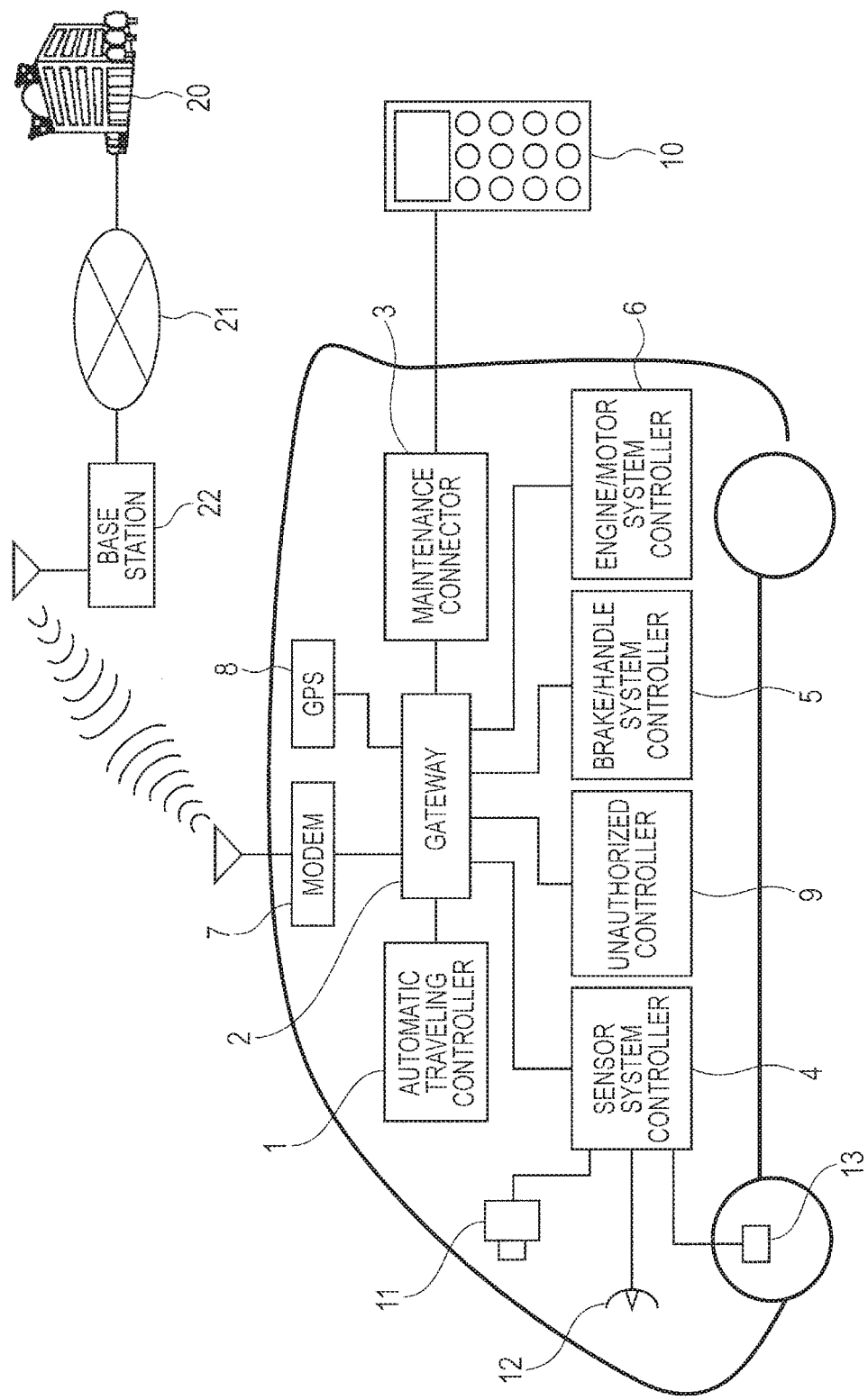
FIG. 4 is an explanatory diagram illustrating an example in which an unauthorized controller is coupled to the on-vehicle system of FIG. 1.
Figure 5:
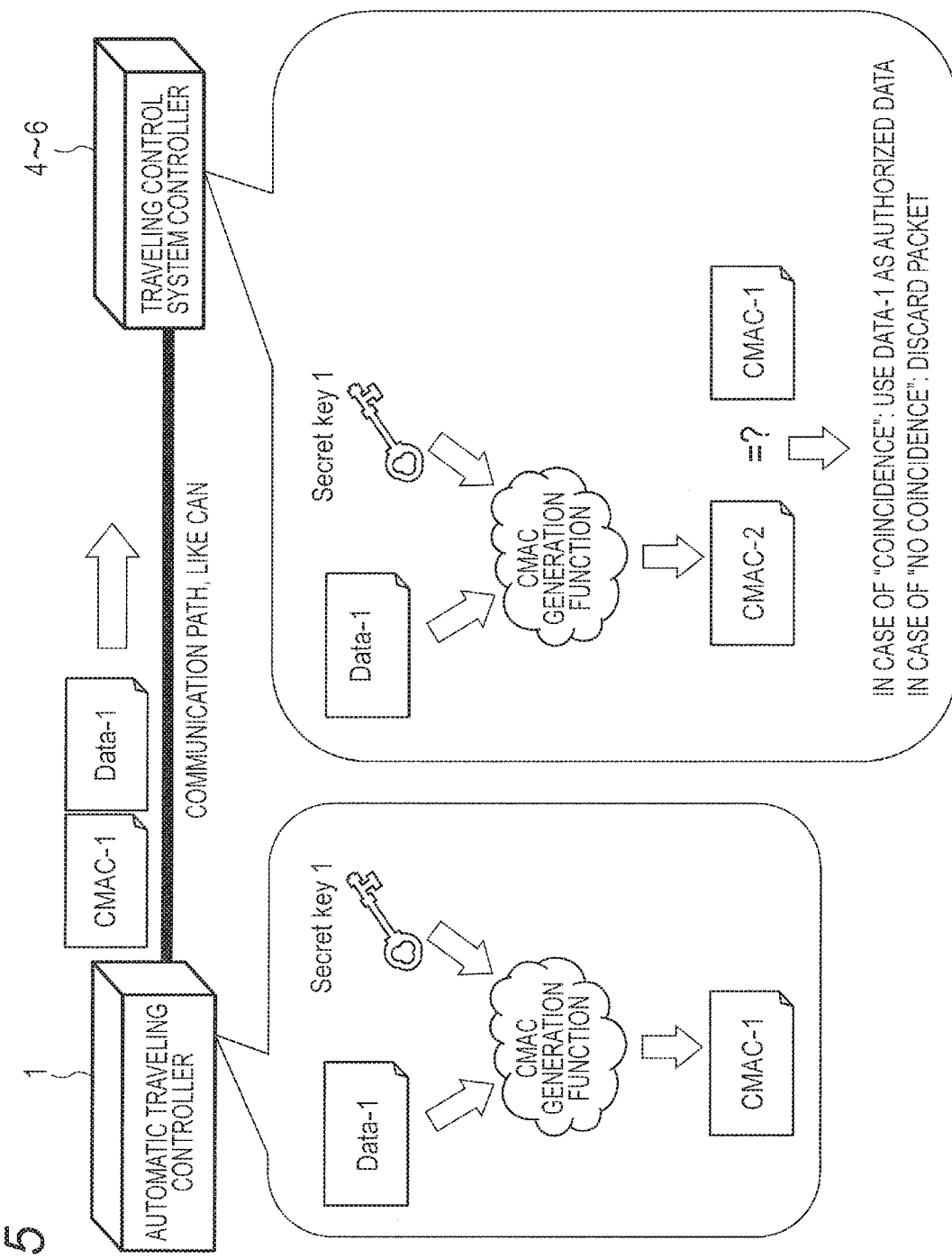
FIG. 5 is an explanatory diagram for explaining an application example for the on-vehicle system with a countermeasure using CMAC.
Figure 6:
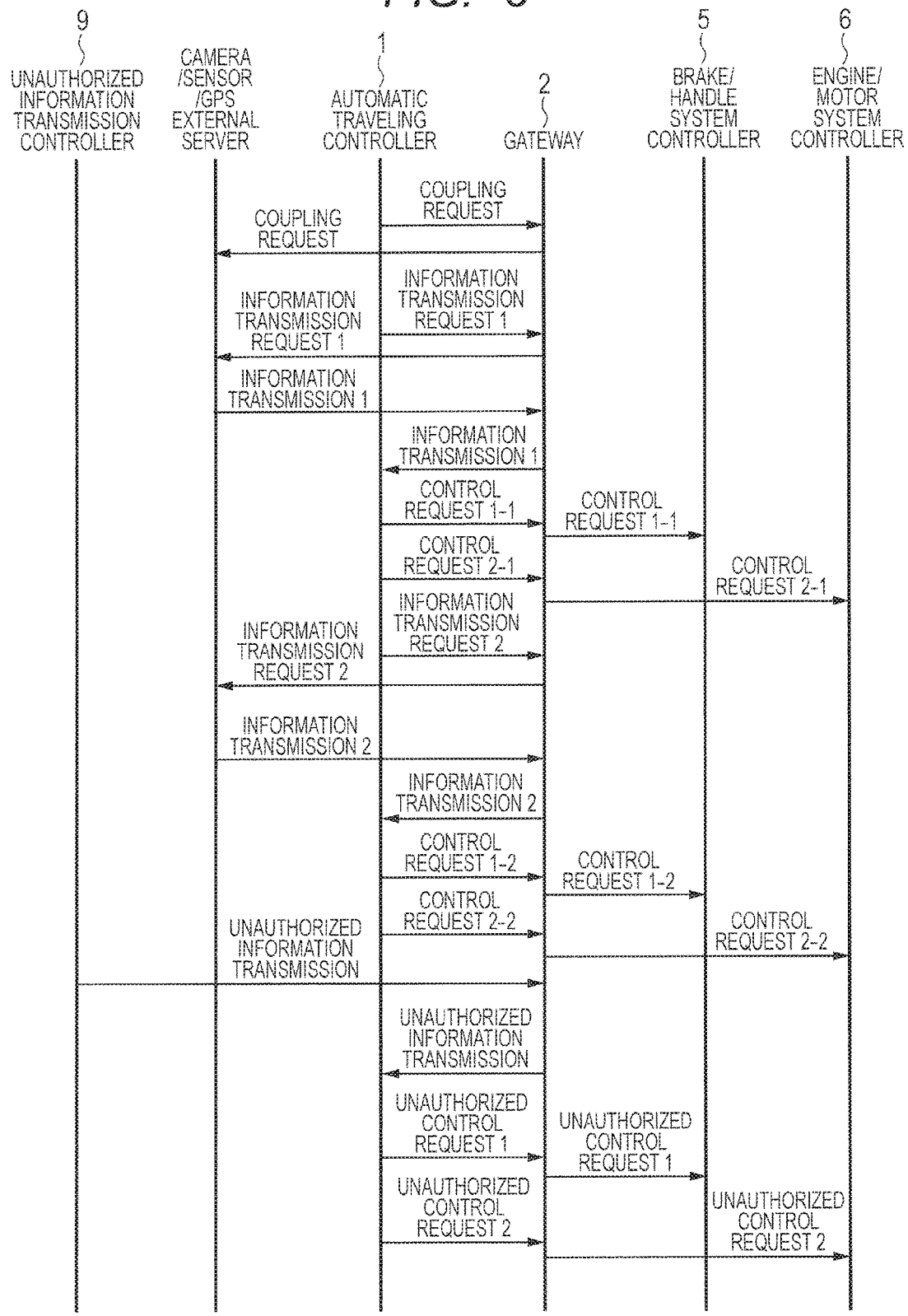
FIG. 6 is a flow diagram illustrating an example of a communication flow of a case where no countermeasure is taken for the impersonation in the on-vehicle system.
Figure 7:
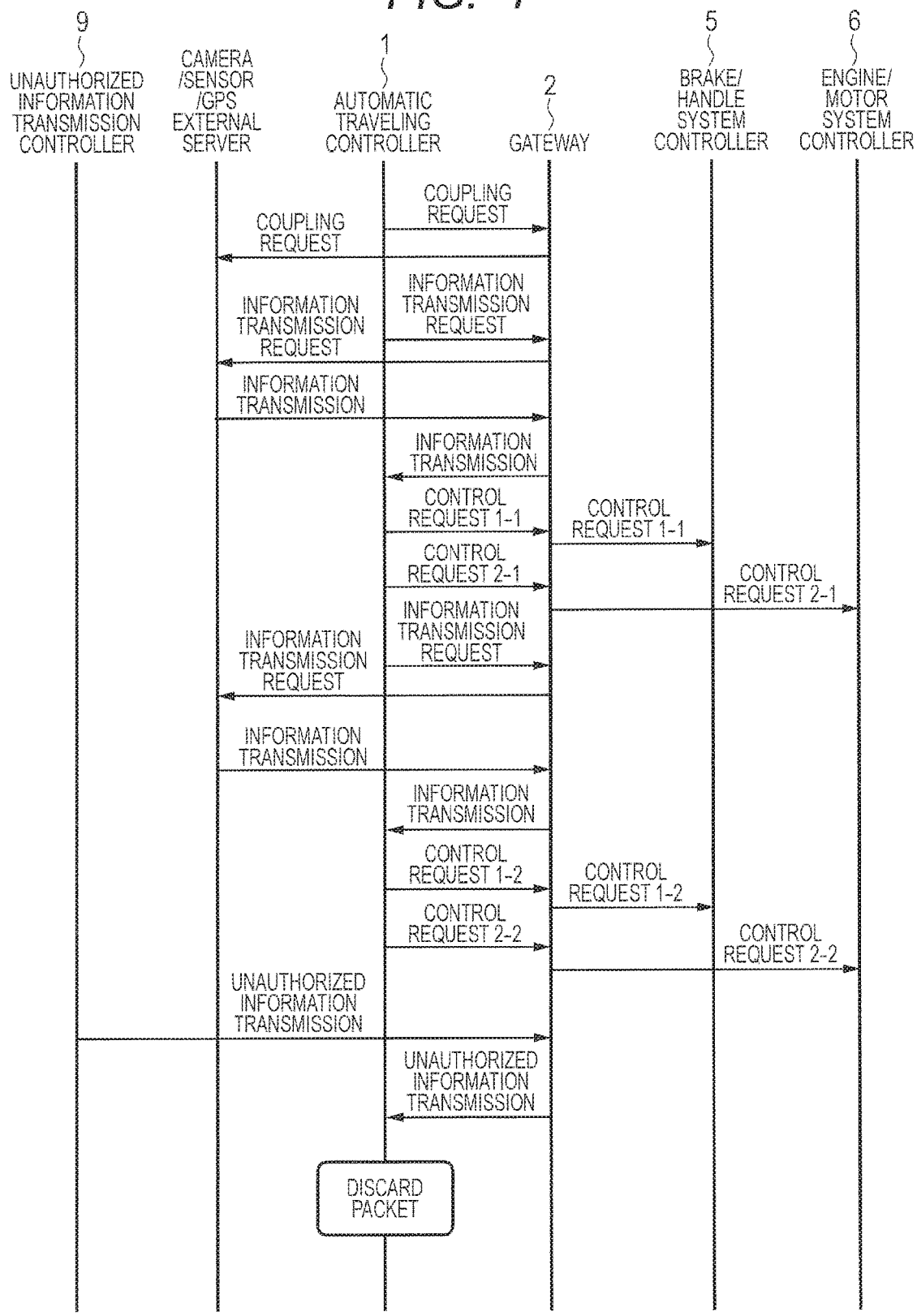
FIG. 7 is a flow diagram illustrating an example of a communication flow of a case where a countermeasure is taken for the impersonation using the CMAC in the on-vehicle system.
Figure 13:
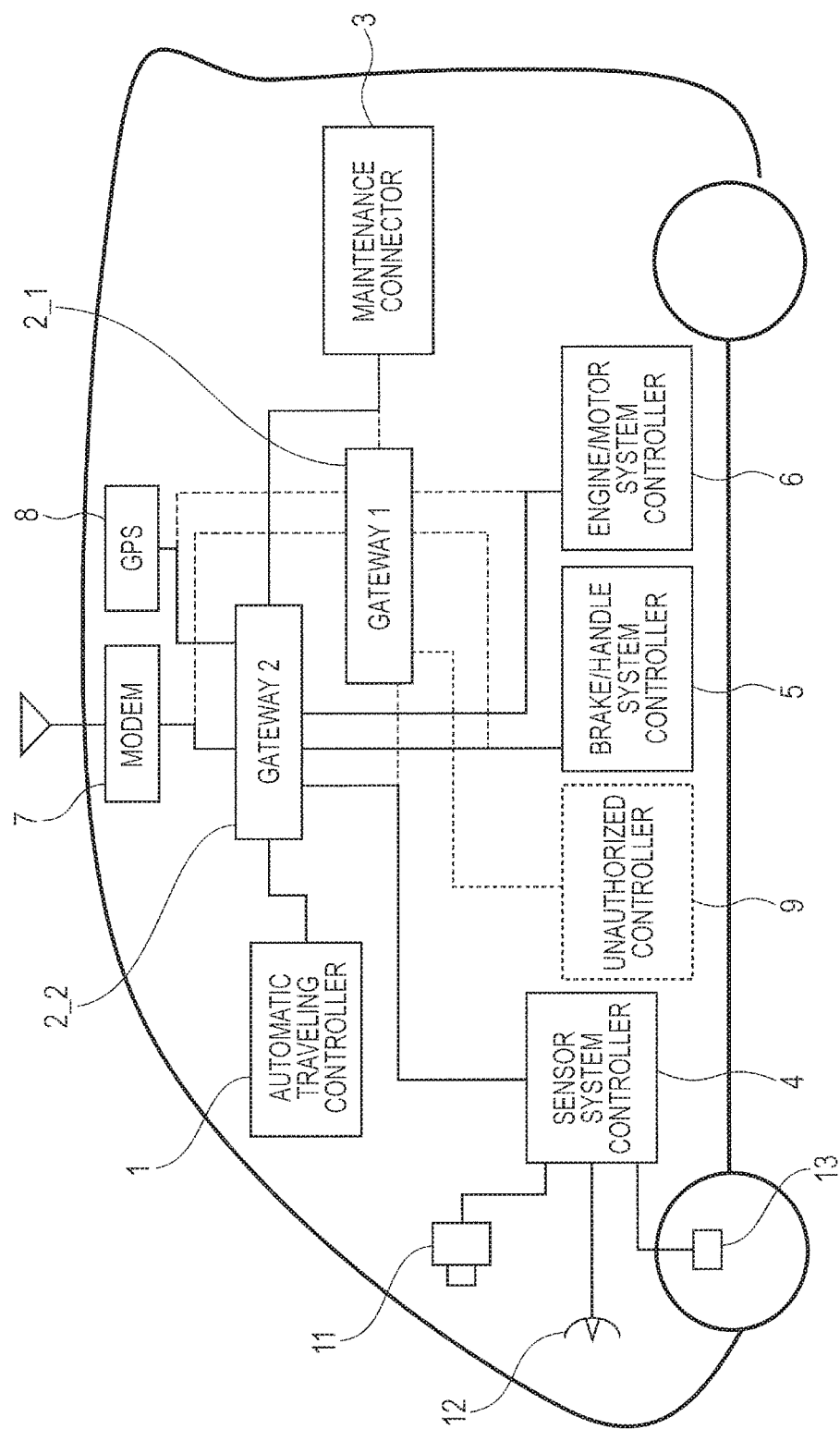
FIG. 13 is an explanatory diagram for explaining an example in which an unauthorized controller is coupled to the on-vehicle system of FIG. 8.

FIG. 13 is an explanatory diagram illustrating an example in which the unauthorized controller 9 is coupled to the on-vehicle system of FIG. 8. Though it has the same configuration as that of FIG. 8, the unauthorized controller 9 is coupled. In FIG. 13, it is coupled directly to the first gateway 1 (gateway 1). However, in fact, it is coupled to an on-vehicle network coupling, for example, the sensor system controller 4 and the first gateway 2_1. Alternatively, there is considered an attack that sends unauthorized software from the maintenance connector 3 to the already-coupled ECU. In this example, it is assumed that the attack is made by impersonation, like the case of FIG. 4.

Figure 14:
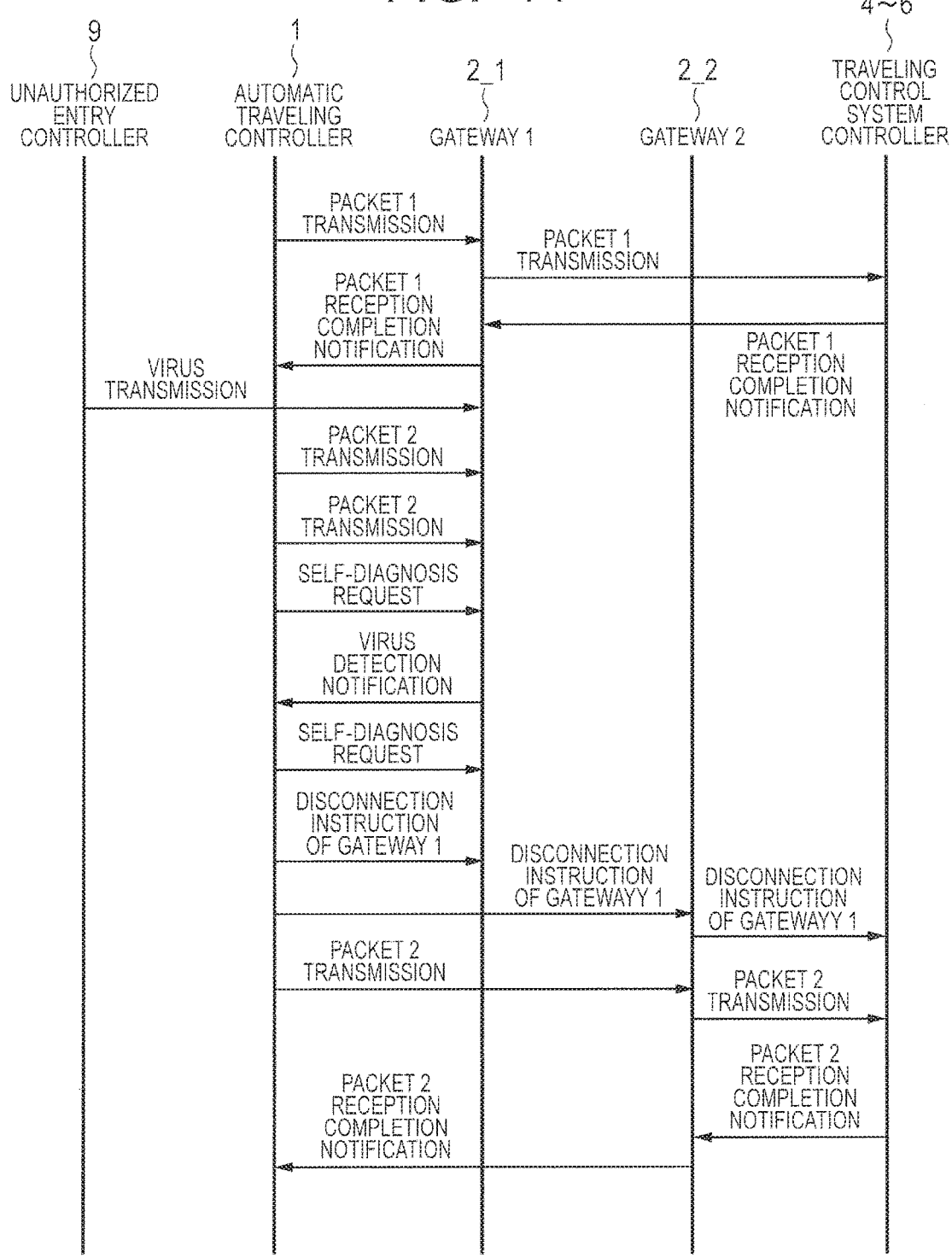
FIG. 14 is a flow diagram illustrating an example of a communication flow of a case where the on-vehicle system, is under a security attack.

FIG. 14 is a flow diagram illustrating an example of a communication flow of a case in which there is a security attack on the on-vehicle system. Before it is under a security attack, the automatic traveling controller 1 transmits a packet 1 to the traveling control system controllers 4 to 6 through the first gateway 2_1 (gateway 1). Then, reception completion notification of the packet 1 is returned from the traveling control system controller 4 to 6 to the automatic traveling controller 1 through the first gateway 2_1. Let it be assumed that the first gateway 2_1 is malfunctioned due to the security attack from the unauthorized controller 9, reception completion notification is not returned, because a packet 2 transmitted by the automatic traveling controller 1 is not transmitted to a normal destination from the first gateway 2_1. After this, though the automatic traveling controller 1 retransmits the packet 2, no reception completion notification is returned yet. Now, the automatic traveling controller 1 requests the first gateway 2_1 to execute self-diagnosis. As a result of the self-diagnosis by the first gateway 2_1, if it reports that the virus has been detected, the automatic traveling controller 1 transmits a disconnection instruction of the first gateway 21 to the traveling control system controllers 4 to 6 as the communication partners through the first gateway and the second gateway to disconnect the first gateway from the network. After this, the automatic traveling controller 1 transmits the packet 2 to the traveling control system controllers 4 to 6 through the second gateway as a replacement of the first gateway 2_1. Then, traveling control is restarted, upon returning of reception completion notification from the traveling control system controllers 4 to 6 through the second gateway 2_2.

Figure 15:
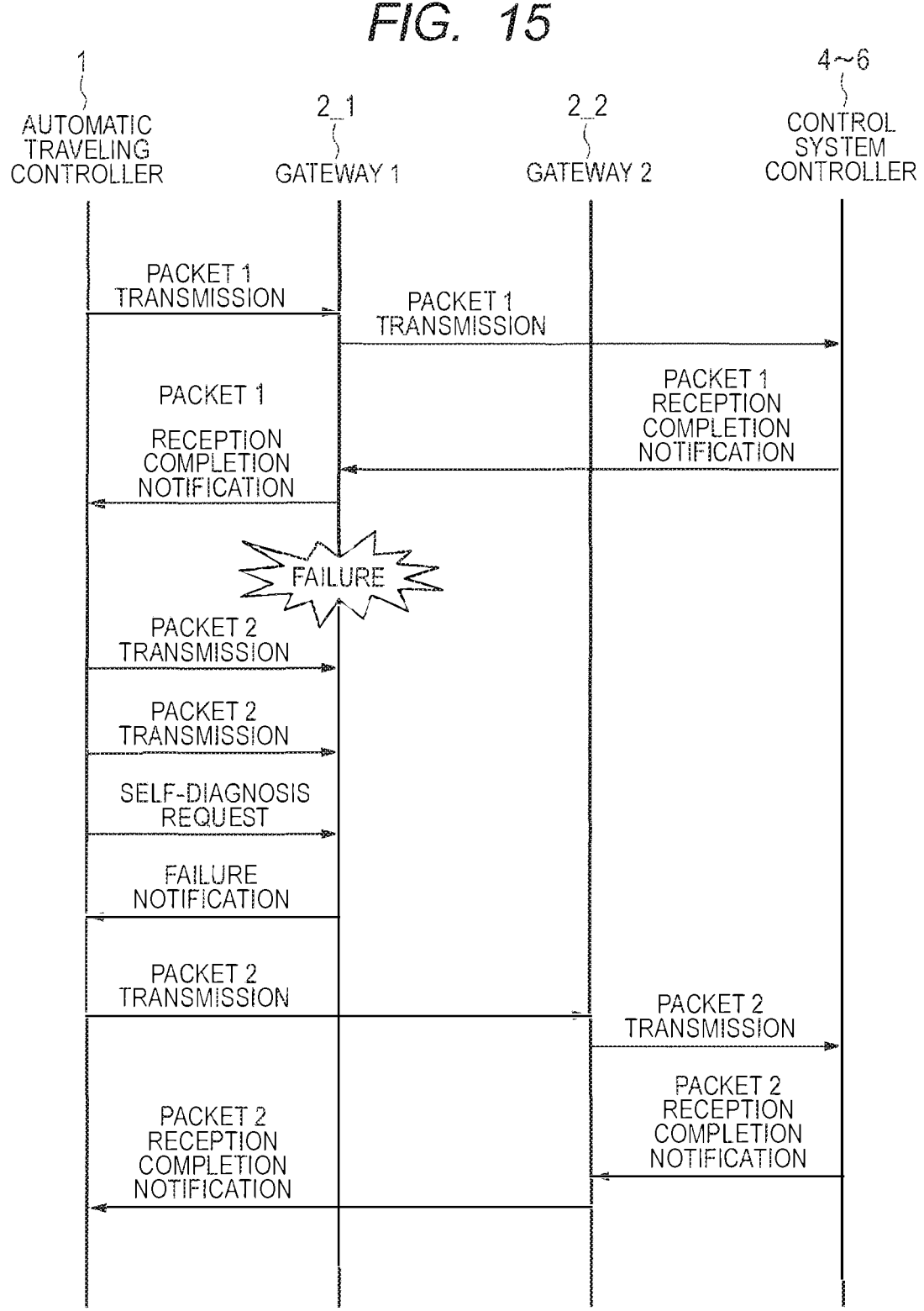
FIG. 15 is a flow diagram illustrating an example of a communication flow of a case where a failure has occurred in a gateway 1 in the on-vehicle system.

FIG. 15 is a flow diagram illustrating an example of a communication flow of a case where a failure has occurred in the gateway 1 in the on-vehicle system. Until occurrence of a failure in the first gateway 2_1 (gateway 1), like the case of FIG. 14, the automatic traveling controller 1 transmits the packet 1 to the traveling control system controllers 4 to 6 through the first gateway 2_1, and then reception completion notification of the packet. 1 is returned from the traveling control system controllers 4 to 6 to the automatic traveling controller 1 through the first gateway 2_1. Upon occurrence of a failure in the first gateway 2_1, no reception completion notification is returned, because the packet 2 transmitted by the automatic traveling controller 1 is not transmitted to a normal destination from the first gateway 2_1. After this, though the automatic traveling controller 1 retransmits the packet 2, no reception completion notification is returned yet. Now, the automatic controller 1 requests the first gateway 2_1 to execute self-diagnosis. As a result, of the self-diagnosis by the first gateway 2_1, if it reports that a failure has occurred, the automatic traveling controller 1 transmits the packet 2 to the traveling control system controllers 4 to 6 through the second gateway 2_2 as a replacement of the first gateway 2*l*. Then, traveling control is restarted, upon returning of reception completion notification from the traveling control system controllers 4 to 6 through the second gateway 2_2. Unlike the case of the security attack illustrated in FIG. 14, the automatic traveling controller 1 does not transmit a disconnection instruction for disconnecting the first gateway from the network.

Accordingly, in the embodiment 1, the security attack and the failure are distinguished, the countermeasure policies are defined appropriately for both cases, and the countermeasure methods are executed in accordance with them.

Figure 16:
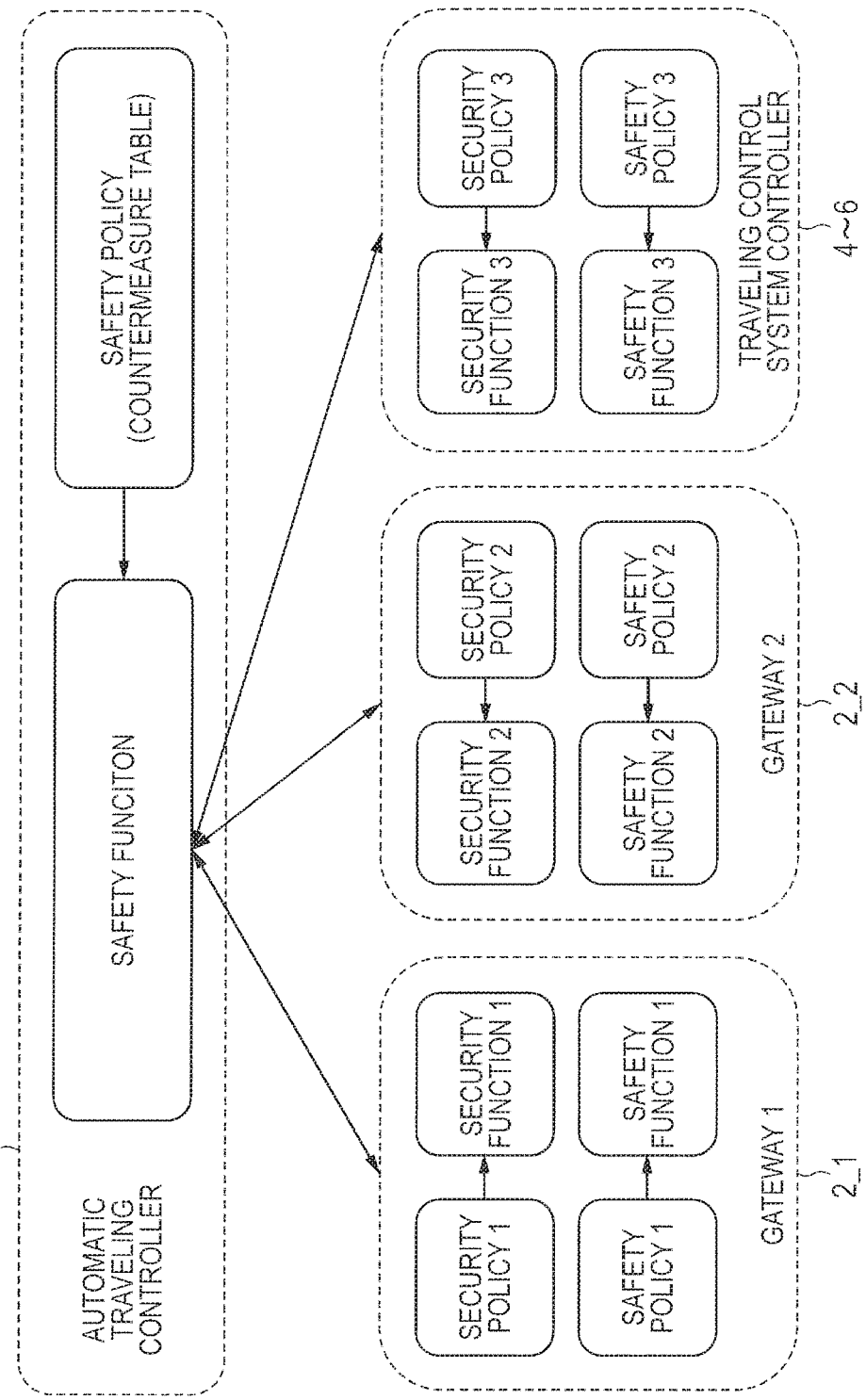
FIG. 16 is a conceptual diagram of a security system with guaranteed functional safety, adopted in the embodiment 1.

FIG. 16 is a conceptual diagram of a security system with guaranteed functional safety, adopted in the embodiment 1. A security policy and a safety policy correspond to the countermeasure table illustrated in FIG. 9. A security manager function ("security function" in the illustration) is for determining it from a viewpoint of security. A functional safety manager function ("safety function" in the illustration) is for determining it from a viewpoint of functional safety. The first and second gateways 2_1 and 2_2 (the gateway 1 and the gateway 2) and the traveling control system controllers 4 to 6 include both the security manager function ("security function") and the functional safety manager function ("safety function"). However, the automatic traveling controller 1 in the high rank includes only the functional safety manager function ("safety function").

As a result, the failure of the gateway and the security attack can be distinguished. It is also possible to adopt an adequate countermeasure method for each case, thereby appropriately securing the functional safety.

The security manager function and the functional safety manager function are provided in the form of programs, operating on a computer, for example, a micro controller installed in the devices. The functions are realized by referring to the security policy or the safety policy stored in the memory unit in the form of the countermeasure table as illustrated, for example, in FIG. 9.

In the embodiment 1, the functional safety manager function in the high rank is mounted on the automatic traveling controller 1. However, the functional safety manager function in the high rank may be mounted on another electronic device. For example, it may be mounted on both the duplexed gateways 2_1 and 2_2. One of the functional safety manager functions may be configured to stop with replacement from one to the other, and to be replaced by the functional safety manager function in the high rank, included in the other getaway.

In the embodiment 1, the automatic traveling controller 1 has been described as one including only the functional safety manager function, by way of example. However, the automatic traveling controller 1 may be configured to include the security manager function and the functional safety manager function in the low rank, and may further include the functional safety manager function in the high rank.

Embodiment 2

In the automatic traveling control flow in the automatic traveling controller 1, the security manager function and the functional safety manager function may be embedded.

Figure 17:
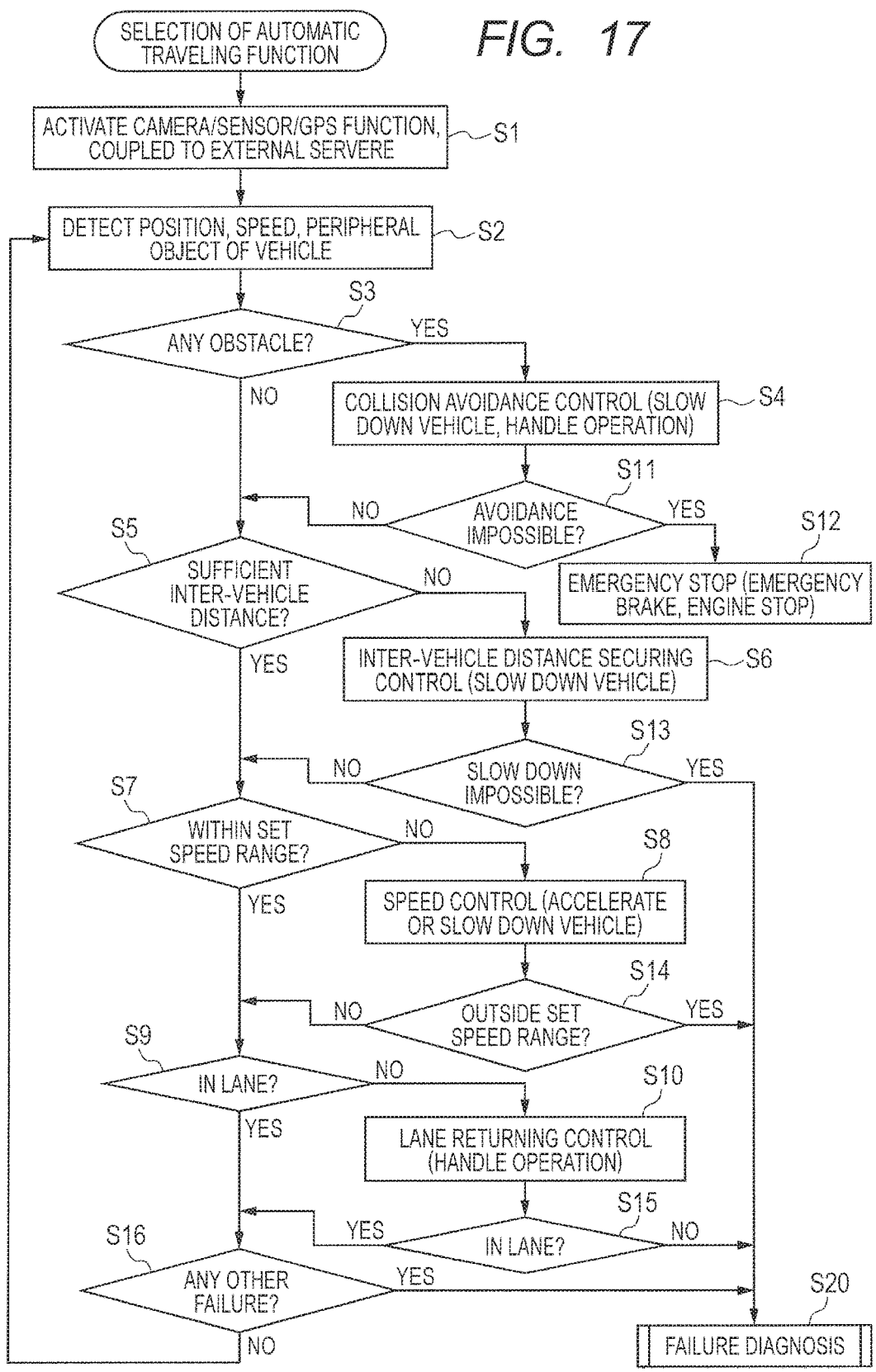
FIG. 17 is a flowchart illustrating a configuration example of a control flow for automatic traveling, with a security manager function and a functional safety manager function embedded therein.

FIG. 17 is a flowchart illustrating a configuration example of a control flow for the automatic traveling, with the security manager function and the functional safety manager function embedded therein. FIG. 18 is a flowchart illustrating a configuration example of failure diagnosis in the flow of FIG. 17.

Figure 2:
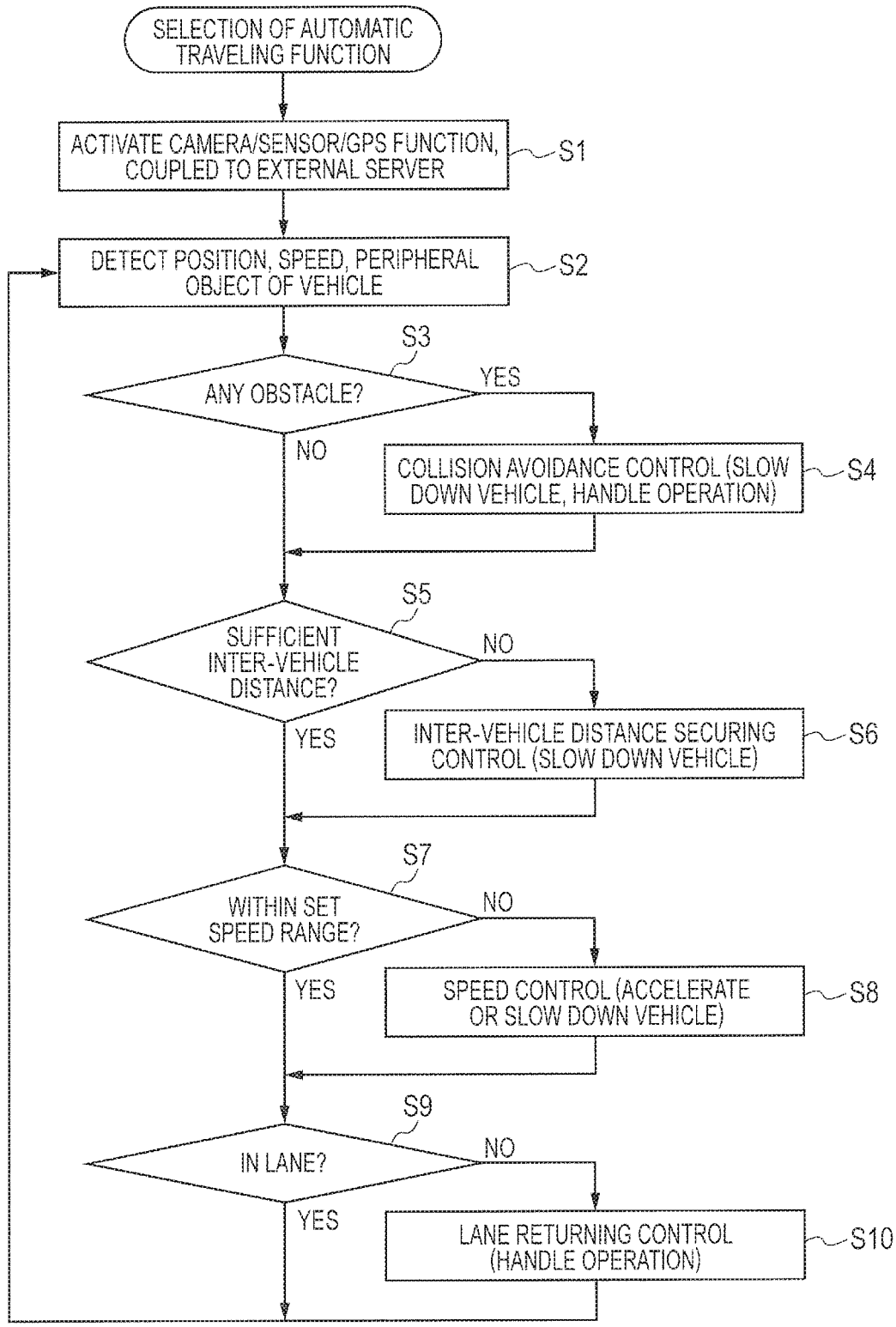
FIG. 2 is a flowchart illustrating a configuration example of a control flow for realizing automatic traveling in the on-vehicle system of FIG. 1.
Figure 3:
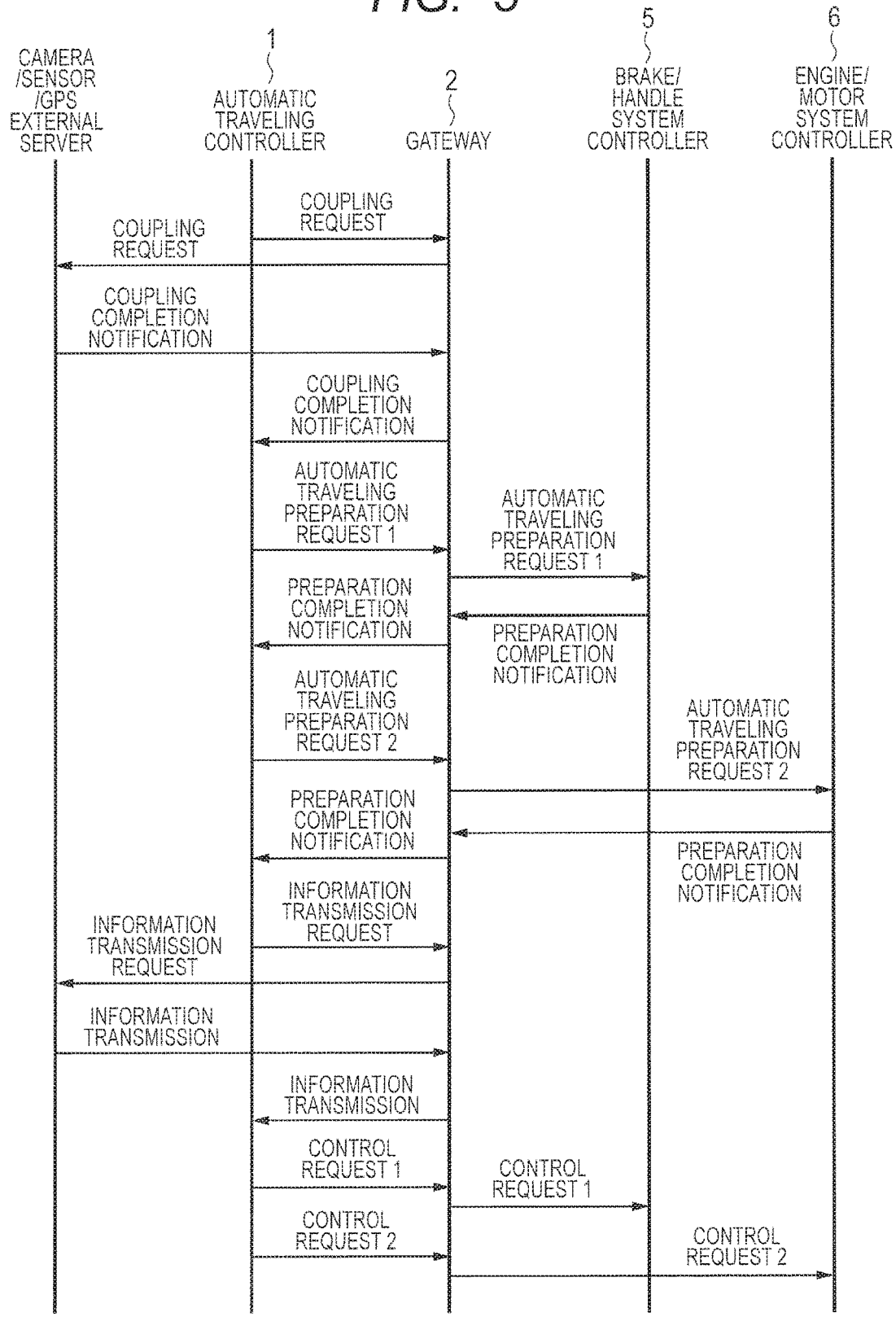
FIG. 3 is a flow diagram illustrating an example of a complication flow for realizing automatic traveling in the on-vehicle system of FIG. 1.

When an automatic traveling function is selected, like the case of FIG. 2, the automatic traveling controller 1 activates the function of camera/peripheral object sensor/GPS, and establishes coupling to the external information server 20 (S1). Next, it detects the position, the speed, and the peripheral object of the own vehicle, based on data collected from the camera 11, the peripheral sensor 12, and the speed sensor 13 and information supplied from the external information server (S2). The automatic traveling controller 1 executes the following controlling based on the information items, thereby realizing the automatic traveling. That is, it, determines whether there is an obstacle (S3) When determined that there is an obstacle, it executes coins ion avoidance control for avoiding the obstacle, by slowing down the vehicle and the handle operation (S4). It calculates the distance to the preceding vehicle, and determines whether the distance between the vehicles is sufficiently secured (S5). When the distance is not sufficiently secured, it executes an inter-vehicle distance securing control for slowing down the vehicle (S6). It obtains the speed of the own vehicle, and determines whether the speed is within a set speed range (S7). When it determines that the speed is outside the set speed range, it executes speed control for slowing down or accelerating the vehicle (S8). It determines whether the own vehicle is adequately travelling in the lane, based on the peripheral images of the own vehicle which are obtained by the camera 11 (S9). When it determines that the own vehicle is outside the lane or may possibly be outside the lane, it executes lane returning control by handle operation (S10).

Unlike the case of FIG. 2, the assumption is made to a case where it is not possible to normally execute the collision avoidance control (S4), the inter-vehicle distance securing control (S6), the speed control (S8), and the lane returning control (S10).

In spite that the collision avoidance control (S4) has been performed, when determined that it is not possible to avoid collision (S11), emergency stop control for stopping the vehicle is performed by making an emergency brake operation (S12). Even when determined that it is not possible to avoid collision (S11), it may be configured to execute the emergency stop control (S12), only if it is not possible to avoid collision after retrying the collision avoidance control (S4) repeatedly a few times, instead of performing the emergency stop control (S12) immediately after that. Also in the case where there is made no clear determination about the possibility of the avoidance in S11, the emergency stop control (S12) may be performed, only if it is easily possible to avoid collision after retrying the collision avoidance control (S4) repeatedly a few times.

In spite that the inter-vehicle distance securing control (S6) is performed, when determined that it is not possible to slow down (S13), the failure diagnosis (S20) is performed. This failure diagnosis (S20) may be started immediately after the determination that the slowing down is impossible, or the failure diagnosis (S20) may be performed only if the slowing down is impossible after the retry of slowing down a few times. Though the slowing down is operated, when it is not sufficient, the failure diagnosis (S20) may be performed only if the slowing down is not sufficiently performed after the retry of slowing down a few times.

In spite that the speed control (S8) is performed, also when the determination (S14) is made that the speed is outside the range of the set speed, the failure diagnosis (S20) is performed. This failure diagnosis (S20) may be started immediately after the determination that the sped is outside the range of the set speed, or may be performed (S20) only if the speed is still outside the set speed after the retry is performed repeatedly a few times. Though the acceleration of or slowing down the vehicle is performed by the speed control (S8), also when the variation speed ratio is not sufficient, the failure diagnosis (S20) may be performed only if the speed is outside the range of the set speed after the retry is performed repeatedly a few times.

In spite that the lane returning control (S10) is performed, when determined that the vehicles in the desired lane for traveling (S15), the failure diagnosis (S20) is performed. This failure diagnosis (S20) may be started immediately after the determination that the vehicle is outside the lane, or may be performed only if it is still outside the lane even after the retry is performed repeatedly a few times. Though the vehicle is controlled to a direction for returning back to the target lane for traveling by the lane returning control (S10), when no improvement is recognized in an evaluation value (lane out-range value) representing an extent that the vehicle is outside the lane, the failure diagnosis (S20) may immediately be performed. When the improvement is recognized, though not enough, the failure diagnosis (320) may be performed only if the vehicle is outside the lane after the retry is performed repeatedly a few times.

Further, the failure diagnosis (S20) is executed also when another failure is suspected (S16). The case where another failure is suspected (S16) implies a case where the failure is suspected by the same simple failure diagnosis as the case where the automatic traveling control is not performed. A simple self-diagnosis function is included in each of the units mounted on the on-vehicle system, for example, the sensor system controller 4, the brake/handle system controller 5, and the engine/motor system controller 6. This simple self-diagnosis function is realized by the semiconductor chip (for example, a micro controller and a semiconductor memory) mounted on each controller. In S16, a determination is made as to whether the failure diagnosis (S20) is performed, in consideration of not only the result of the simple self-diagnosis result, but also the function impossibility information from each controller, or the diagnosis result by a source control IC (Integrated Circuit) or the off-chip sensor including a temperature sensor.

In the failure diagnostic process illustrated in FIG. 18, the failure diagnosis is performed (S21). Specifically, for example, specific diagnosis including BIST (Built In Self-Test) is performed to specify any of those failure positions. Further, it is performed by a virus checker in each controller, and a check periodically made whether there is a secure boot function of the programs and whether there is suspicious data stored in the memory.

As a result of the failure diagnosis (S21), when it is determined that there is no problem to such an extent of disturbing the automatic traveling (S22), the automatic traveling control continues (S25). When determined that there is a problem, it requests the driver to cancel the automatic traveling function (S23). After this, a predetermined cancellation waiting time is waited, and it is determined whether the automatic traveling function is cancelled (S24). When the cancellation is made, it is returned to the normal traveling (S26). When the cancellation is not made, the vehicle is brought to an emergency stop (S27). The emergency stop includes, for example, controlling of the vehicle to stop on the road shoulder by an emergency brake operation, and to stop the engine.

In the determination (S16) as to whether there is another failure, the traffic (that is, the number of packets) in the communication path (for example, the CAN) in the on-vehicle system is monitored in, for example, the background. Also in the case where the number of packets is out of an assumed range, the failure diagnosis (S20) may be performed. In the failure diagnosis (S21), the unauthorized program is eliminated, and its result is judged. When it is not possible to return to the normal state, the flow may proceed to the cancellation request (S23) for requesting the next driver to cancel the automatic traveling function.

Accordingly, the descriptions have specifically been made to the present invention made by the present inventors. However, needless to say, the present invention is not limited to the above, and various changes may be made without departing from the scope thereof.

What is claimed is:

1. An on-vehicle system comprising an electronic device, a first gateway, and a controller enabling communication with the electronic device through the first gateway,
   wherein the on-vehicle system has a countermeasure table,
   wherein the countermeasure table defines a failure phenomenon occurring in communication between the controller and the electronic device through the first gateway, an identification method for identifying a factor on whether the failure phenomenon is caused by a failure of the first gateway or by a security attack on the first gateway, and a countermeasure method corresponding to the factor,
   wherein the on-vehicle system further includes a second gateway,
   wherein when it is detected that the failure phenomenon has occurred in the communication between the controller and the electronic device through the first gateway, the controller controls the first gateway to execute self-diagnosis in accordance with the occurred failure phenomenon, determines the factor of the failure phenomenon based on a result on the self-diagnosis, and makes countermeasures in accordance with the countermeasure method corresponding to the determined factor, based on the identification method defined in the countermeasure table,
   wherein the controller replaces the first gateway by the second gateway when it is determined that the factor of the failure phenomenon is caused by the failure of the first gateway, and
   wherein the controller replaces the first gateway by the second gateway, and disconnects the first gateway from a communication path between the controller and the electronic device when it is determined that the factor of the failure phenomenon is caused by the security attack on the first gateway.

2. The on-vehicle system according to claim 1,
   wherein the countermeasure table includes a first identification method for controlling the first gateway to execute the self-diagnosis in accordance with the occurred failure phenomenon, and for determining whether the factor of the failure phenomenon is the failure of the first gateway or the security attack on the first gateway, based on a result of the self-diagnosis.

3. The on-vehicle system according to claim 2,
   wherein the failure phenomenon includes a first failure phenomenon that a reception completion notification returned from the electronic device through the first gateway cannot be received by the controller for a packet transmitted from the controller to the electronic device through the first gateway, and
   wherein the first identification method includes, for the first failure phenomenon, a method for retransmitting the packet from the controller, and for controlling the first gateway to perform the self-diagnosis in a first case where the reception completion notification has successfully been received, and for determining the failure of the first gateway in a second case where the reception completion notification has not successfully been received.

4. The on-vehicle system according to claim 3,
   wherein the first identification method includes another method for counting a number of errors that the first case has occurred,
   continuing to use the first gateway when the number of errors does not exceed a predetermined number, if it is diagnosed that there is no problem in the first gateway as a result of the self-diagnosis, and
   determining that there is the failure of the first gateway when the number of errors exceeds a predetermined number, even if it is diagnosed that, there is no problem in the first gateway as a result of the self-diagnosis.

5. The on-vehicle system according to claim 3,
   wherein the countermeasure table further includes a second identification method,
   wherein the failure phenomenon includes a second failure phenomenon that the reception completion notification returned from the electronic device through the first gateway is received by the controller after a first predetermined time for the packet transmitted from the controller to the electronic device through the first gateway, and
   wherein the second identification method includes, for the second failure phenomenon, a method for counting a number of delays that the second failure phenomenon has occurred, and for determining that there is the failure of the first gateway when the number of delays exceeds a predetermined number, or when the reception completion notification is received beyond a second predetermined time later than the first predetermined time.

6. The on-vehicle system according to claim 1, wherein the controller is a controller for controlling a vehicle having the on-vehicle system mounted thereon to perform automatic traveling, and the electronic device is another controller for controlling various sensors mounted on the vehicle or another controller for controlling traveling of the vehicle.

7. A non-transitory computer readable recording medium storing a program operable on and executed by a computer installed in an on-vehicle system including an electronic device, a first gateway and a second gateway, and a controller enabling communication with the electronic device through the first gateway or the second gateway,
   wherein the program has a countermeasure table defining a failure phenomenon occurring in communication between the controller and the electronic device through the first gateway, an identification method for identifying a factor on whether the failure phenomenon is caused by a failure of the first gateway or a security attack on the first gateway, and a countermeasure method corresponding to the factor, wherein when it is detected that the failure phenomenon has occurred in communication between the controller and the electronic device through the first gateway, the program, when executed by the computer, controls the first gateway to perform self-diagnosis in accordance with the occurred failure phenomenon, determines a factor of the failure phenomenon based on a result of the self-diagnosis and the identification method defined in the countermeasure table, and makes countermeasure in accordance with the countermeasure method corresponding to the determined factor, wherein the program, when executed by the computer, replaces the first gateway by the second gateway when it is determined that the factor of the failure phenomenon is the failure of the first gateway, and wherein the program, when executed by the computer, replaces the first gateway by the second gateway, and disconnects the first gateway from a communication path between the controller and the electronic device when it is determined that the factor of the failure phenomenon is the security attack on the first gateway.

8. The non-transitory computer readable recording medium according to claim 7, wherein the computer on which the program operates is installed in the controller.

9. The non-transitory computer readable recording medium according to claim 8,
wherein the countermeasure table includes a first identification method for controlling the first gateway to perform the self-diagnosis in accordance with the occurred failure phenomenon, and for determining whether the factor of the failure phenomenon is the failure of the first gateway or the security attack on the first gateway, based on a result of the self-diagnosis.

10. The non-transitory computer readable recording medium according to claim 9,
wherein the failure phenomenon includes a first failure phenomenon that a reception completion notification returned from the electronic device through the first gateway cannot be received by the controller, for a packet transmitted from the controller to the electronic device through the first gateway, and
wherein the first identification method includes, for the first failure phenomenon, a method for retransmitting the packet from the controller, for controlling the first gateway to perform the self-diagnosis in a first case where the reception completion notification has successfully been received, and for determining that there is the failure of the first gateway in a second case where the reception completion notification has not successfully been received.

11. The non-transitory computer readable recording medium according to claim 10,
wherein the first identification method includes another method for counting a number of errors that the first case has occurred,
continuing to use the first gateway when the number of errors does not exceed a predetermined number, if it is diagnosed that there is no problem in the first gateway as a result of the self-diagnosis, and
determining that there is the failure of the first gateway when the number of errors exceeds the predetermined number, even if it is diagnosed that there is no problem in the first gateway as a result of the self-diagnosis.

12. The non-transitory computer readable recording medium according to claim 10,
wherein the countermeasure table further includes a second identification method,
wherein the failure phenomenon includes a second failure phenomenon that the reception completion notification returned from the electronic device through the first gateway is received by the controller after a first predetermined time for the packet transmitted from the controller to the electronic device through the gateway, and
wherein the second identification method includes a method for counting a number of delays that the failure phenomenon has occurred, and for determining that there is the failure of the first gateway when the number of delays exceeds a predetermined number, or when the reception completion notification has been received beyond a second predetermined time later than the first predetermined time.

13. The non-transitory computer readable recording medium according to claim 8,
wherein the controller is a controller for controlling a vehicle having the on-vehicle system mounted thereon to perform automatic traveling, and the electronic device is another controller for controlling various sensors mounted on the vehicle or another controller for controlling traveling of the vehicle, and wherein the program is executed on the computer installed in the controller, thereby performing the controlling for the vehicle to perform the automatic traveling.

14. A controller which can be mounted on an on-vehicle system and communicate with an electronic device in the on-vehicle system through a gateway or a replacement relay device for replacing the gateway,
wherein the controller has a countermeasure table,
wherein the countermeasure table defines a failure phenomenon occurring in communication between the controller and the electronic device through the gateway, an identification method for identifying a factor on whether the failure phenomenon is caused by a failure of the gateway or caused by a security attack on the gateway, and a countermeasure method corresponding to the factor,
wherein when it is detected that the failure phenomenon has occurred in communication between the controller and the electronic device through the gateway, the controller controls the gateway to execute self-diagnosis in accordance with the occurred failure phenomenon, determines the factor of the failure phenomenon based on a result of the self-diagnosis and the identification method defined in the countermeasure table, and makes countermeasures in accordance with the countermeasure method corresponding to the determined factor,
wherein when the factor of the failure phenomenon is the failure of the gateway, the controller controls the gateway to be replaced by the replacement relay device, and
wherein when the factor of the failure phenomenon is the security attack on the gateway, the controller controls the gateway to be replaced by the replacement relay device, and disconnects the gateway from a communication path between the controller and the electronic device.

15. The controller according to claim 14, wherein the countermeasure table includes a first identification method for controlling the gateway to execute the self-diagnosis in accordance with the occurred failure phenomenon, and for determining whether the factor of the failure phenomenon is the failure of the gateway or the security attack on the gateway, based on a result of the self-diagnosis.

16. The controller according to claim 15, wherein the failure phenomenon includes a first failure phenomenon that reception completion notification returned from the electronic device through the gateway cannot be received by the controller for a packet transmitted from the controller to the electronic device through the gateway, and wherein the first identification method includes a method for controlling the gateway to perform the self-diagnosis in a first case where the reception completion notification has successfully been received, after retransmission of the packet, and for determining that there is the failure of the gateway in a second case where the reception completion notification has not successfully been received by the controller.

17. The controller according to claim 16, wherein the first identification method includes another method for counting a number of errors that the first case has occurred, continuing to use the gateway, when the number of errors does not exceed a predetermined number, if it is diagnosed that there is no problem in the gateway as a result of the self-diagnosis, and determining that there is the failure of the gateway when the number of errors does not exceed the predetermined number, even if it is diagnosed that there is no problem in the gateway as a result of the self-diagnosis.

18. The controller according to claim 16, wherein the countermeasure table further includes a second identification method, wherein the failure phenomenon includes a second failure diagnosis phenomenon that reception completion notification returned from the electronic device through the gateway is received by the controller after elapse of a first predetermined time for the packet transmitted from the controller to the electronic device through the gateway, and wherein the second identification method includes, for the second failure phenomenon, a method for counting a number of delays that the failure phenomenon has occurred, and for determining that there is the failure of the gateway when the number of delays exceeds a predetermined number, or when the reception completion notification has successfully been received beyond a second predetermined time later than the first predetermined time.

19. The controller according to claim 14, wherein the controller is a controller for controlling a vehicle with the on-vehicle system mounted thereon to perform automatic traveling, and the electronic device is another controller for controlling various sensors mounted on the vehicle or another controller for controlling traveling of the vehicle.

* * * * *